United States Patent
Polt et al.

(10) Patent No.: US 12,478,585 B2
(45) Date of Patent: Nov. 25, 2025

(54) MICELLES AND VESICLES FOR THE DELIVERY OF GLYCOPEPTIDES

(71) Applicant: ARIZONA BOARD OF REGENTS ON BEHALF OF THE UNIVERSITY OF ARIZONA, Tucson, AZ (US)

(72) Inventors: Robin L. Polt, Tucson, AZ (US); Dillon Hanrahan, Tucson, AZ (US); Lajos Z. Szabo, Tucson, AZ (US); Michael L Heien, Tucson, AZ (US); Chenxi Liu, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 471 days.

(21) Appl. No.: 18/057,665

(22) Filed: Nov. 21, 2022

(65) Prior Publication Data

US 2023/0104480 A1    Apr. 6, 2023

Related U.S. Application Data

(63) Continuation-in-part of application No. 16/637,671, filed as application No. PCT/US2018/046078 on Aug. 9, 2018, now Pat. No. 11,504,325.
(Continued)

(51) Int. Cl.
*A61K 9/12*    (2006.01)
*A61K 9/1272*  (2025.01)
(Continued)

(52) U.S. Cl.
CPC ............ *A61K 9/1272* (2013.01); *A61K 38/07* (2013.01); *A61K 38/08* (2013.01); *A61K 38/085* (2013.01);
(Continued)

(58) Field of Classification Search
None
See application file for complete search history.

(56) References Cited

U.S. PATENT DOCUMENTS

| 2008/0207492 A1 | 8/2008 | Polt et al. |
| 2012/0244210 A1 | 9/2012 | Shinohara et al. |

FOREIGN PATENT DOCUMENTS

| WO | 2014152795 A2 | 9/2014 | |
| WO | WO-2019032877 A1 * | 2/2019 | ............... A61K 9/51 |

OTHER PUBLICATIONS

Sarker et al.. "Lung surfactant protein A (SP-A) interactions with model lung surfactant lipids and an SP-B fragment." Biochemistry 50.22 (2011): 4867-4876.
(Continued)

*Primary Examiner* — Brian Gulledge
(74) *Attorney, Agent, or Firm* — NGUYEN TARBET IP LAW

(57) ABSTRACT

Methods for quality control and optimizing the formation and characterization of micelles, vesicles or other aggregates are described herein. Pharmaceutically relevant peptides may be modified to form glycopeptide surfactants which form micelles or other aggregates with another surfactant. Glycopeptide and glycolipid surfactants can aggregate to form particles that enhance drug delivery. The glycopeptide surfactants may be drugs or prodrugs which are delivered via the micelles or other aggregated structures.

19 Claims, 17 Drawing Sheets

Related U.S. Application Data

(60) Provisional application No. 62/543,362, filed on Aug. 9, 2017.

(51) Int. Cl.
*A61K 38/07* (2006.01)
*A61K 38/08* (2019.01)
*A61K 38/095* (2019.01)
*A61K 38/18* (2006.01)
*A61K 47/12* (2006.01)
*A61K 47/18* (2017.01)
*A61K 47/20* (2006.01)
*A61K 47/26* (2006.01)

(52) U.S. Cl.
CPC ........ *A61K 38/095* (2019.01); *A61K 38/1866* (2013.01); *A61K 47/12* (2013.01); *A61K 47/18* (2013.01); *A61K 47/186* (2013.01); *A61K 47/20* (2013.01); *A61K 47/26* (2013.01)

(56) References Cited

OTHER PUBLICATIONS

Polt et al. "Delta-Selective Glycopeptides Related to Enkephalin Produce Profound Analgesia with Reduced Side Effects in Mice". Arizona Univ Tucson Dept of Chemistry, 2004.
Szabo et al. "Preparation of S-glycoside surfactants and cysteine thioglycosides using minimally competent Lewis acid catalysis." Carbohydrate research 422 (2016): 1-4.
Aplin et al.. "Preparation, Properties, and Applications of Carbohydrate Conjugates of Proteins and Lipid." Critical Reviews in Biochemistry 10.4 (1981): 259-306.
Ji et al. "Synthesis and properties of alkoxyethyl 2-acetamido-2-deoxy-a-D-glucopyranoside." Journal of Molecular Liquids 242 (2017): 1169-1175.
Garavito, R. Michael, and Shelagh Ferguson-Miller. "Detergents as tools in membrane biochemistry." Journal of Biological Chemistry 276.35 (2001): 32403-32406.

* cited by examiner

MICELLES AND VESICLES FOR THE DELIVERY OF GLYCOPEPTIDES

CROSS REFERENCES TO RELATED APPLICATIONS

This application is a continuation-in-part and claims benefit of U.S. patent application Ser. No. 16/637,671 filed Feb. 7, 2020, which is a 371 and claims benefit of PCT Application No. PCT/US18/46078 filed Aug. 9, 2018, which claims benefit of U.S. Provisional Application No. 62/543,362, filed Aug. 9, 2017, the specification(s) of which is/are incorporated herein in their entirety by reference.

STATEMENT REGARDING FEDERALLY SPONSORED RESEARCH OR DEVELOPMENT

This invention was made with government support under Grant No. 1339597, awarded by National Science Foundation, and Grant No. NS091238, awarded by National Institutes of Health. The government has certain rights in the invention.

FIELD OF THE INVENTION

The present invention relates to glycoprotein and lipoprotein co-surfactants, their formation of micelles and vesicles for glycopeptide delivery, and the characterization of said micelles and vesicles by Diffusion Ordered Spectroscopy (DOSY).

BACKGROUND OF THE INVENTION

Surfactants have a variety of applications in several industries including cleaning products, crop and food productions, cosmetics, medicine, mineral extraction, and many others. Most industrial surfactants are ionic, coming from sulphate and phosphate salts of fatty acids or other lipids. Glycopeptides are a natural variety of surfactants composed of a hydrophilic carbohydrate head group with a lipophilic tail.

A current pharmaceutical challenge is the development of safe and effective oral formulations for macromolecules, including peptides and proteins. Barriers to developing oral formulations for proteins and peptides include poor intrinsic permeability, lumenal and cellular enzymatic degradation, rapid clearance, and chemical instability in the gastrointestinal (GI) tract. Pharmaceutical approaches to address these barriers that have been successful with traditional small, organic drug molecules have not readily translated into effective peptide and protein formulations.

The general strategy of pharmaceutical delivery using micelles and vesicles is well known in the art. Encapsulation and diffusion of drugs and pro-drugs in and from micelles and vesicles have been widely studied and various surfactants have been synthesized for the formation of said micelles and vesicles. The present invention features novel surfactant compositions that form micelles and vesicles.

The formation of new micelles and vesicles for specific applications necessitates methods for their optimization. One especially informative metric of a micelle or vesicle is its diffusion coefficient. From this, properties such as the critical micelle concentration, particle radius, and aggregation number can be determined. Changes in the diffusion coefficient are indicative of how the system is changed.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a method of optimizing the formation of a micelle or vesicle. The invention also features a method of quality control for the formation of a micelle or vesicle and a method for delivery of a glycopeptide using a micelle or vesicle. Various pharmaceutically relevant peptides can be modified to form glycopeptides which may be easier to deliver to the therapeutic site. In one embodiment, these glycopeptides may either act intact as drugs. In an alternative embodiment, these glycopeptides may be designed for cleavage and release of the original peptide, such as a prodrug.

In some aspects, the method of optimizing a formation of a micelle or vesicle may comprise forming a first micelle or vesicle from two or more co-surfactants according to two or more parameters, characterizing the first micelle or vesicle using Diffusion Ordered Spectroscopy (DOSY) to determine a first diffusion coefficient, changing at least one of the parameters and forming a second micelle or vesicle, characterizing the second micelle or vesicle using Diffusion Ordered Spectroscopy (DOSY) to determine a second diffusion coefficient, and comparing the first and second diffusion coefficients to determine if the first or second micelle or vesicle is more optimal for a specific application. As a non-limiting example, the parameters may include a number of components, a selection of components, a ratio of components, a concentration of components, an order of component addition, a temperature, a mixing time, or a solvent system.

In other aspects, the method of quality control for the formation of a micelle or vesicle may comprise forming a micelle or vesicle from two or more co-surfactants, characterizing the micelle or vesicle using Diffusion Ordered Spectroscopy (DOSY) to determine a diffusion coefficient, and determining the quality of the micelle or vesicle by comparing the diffusion coefficient to an optimal range of diffusion coefficients for a specific application.

In some embodiments, the first co-surfactant comprises a glycopeptide and the second co-surfactant comprises a glycolipid. The glycopeptides may comprise a peptide linked to a saccharide. The glycolipid may be according to any of the following structures:

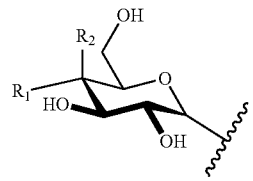

Glc: $R_1 = OH, R_2 = H$
Gal: $R_1 = H, R_2 = OH$
Cel: $R_1 = O\text{-}\beta\text{-}D\text{-}Glc, R_2 = H$
Lac: $R_1 = O\text{-}\beta\text{-}D\text{-}Gal, R_2 = H$
Mal: $R_1 = O\text{-}\alpha\text{-}D\text{-}Glc, R_2 = H$ -continued

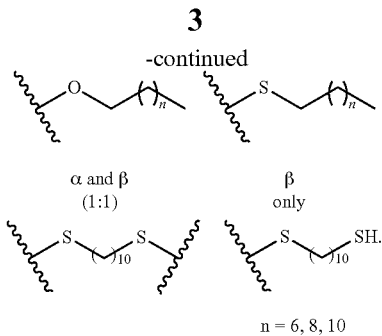

α and β
(1:1)

β
only n = 6, 8, 10

The first co-surfactant and the second co-surfactant can aggregate to form said micelle or vesicle. The micelle or vesicle can be used in a glycopeptide delivery system.

One of the unique and inventive technical features of the present invention is that the diffusion coefficient of the micelle or vesicle is determined by DOSY. Without wishing to limit the invention to any theory or mechanism, it is believed that the technical feature of the present invention advantageously provides optimization or quality control of a micelle or vesicle formed from glycopeptide and glycolipid co-surfactants. None of the presently known prior references or work has the unique inventive technical feature of the present invention.

Another unique and inventive technical feature of the present invention is that the glycopeptide to be delivered functions as a co-surfactant. Without wishing to limit the invention to any theory or mechanism, it is believed that the technical feature of the present invention advantageously provides for micelle or vesicle formation with incorporation of the glycopeptide and subsequent effective drug delivery. None of the presently known prior references or work has the unique inventive technical feature of the present invention.

Another unique and inventive technical feature of the present invention is the use of a glycopeptide-lipid supramolecular assembly wherein the glycopeptide constitutes a drug or drug candidate.

Another unique and inventive technical feature of the present invention is the ability of the supramolecular assembly of the present invention to deliver a glycopeptide to a cell without the supramolecular assembly fusing into the cell and/or without destruction of the supramolecular assembly. Without wishing to limit the invention to any theory or mechanism, it is believed that the technical feature of the present invention advantageously allows the supramolecular assembly of the present invention to deliver at least one glycopeptide to a membrane via repeated intermittent physical interactions between the supramolecular assembly and the membrane. Without wishing to limit the invention to any theory or mechanism, it is believed that the technical feature of the present invention advantageously provides for delivery of glycopeptide in a metered fashion that may avoid delivering all of the glycopeptide of a given supramolecular assembly via a single physical interaction between said supramolecular assembly and a another physical entity, e.g., a cell.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1A:
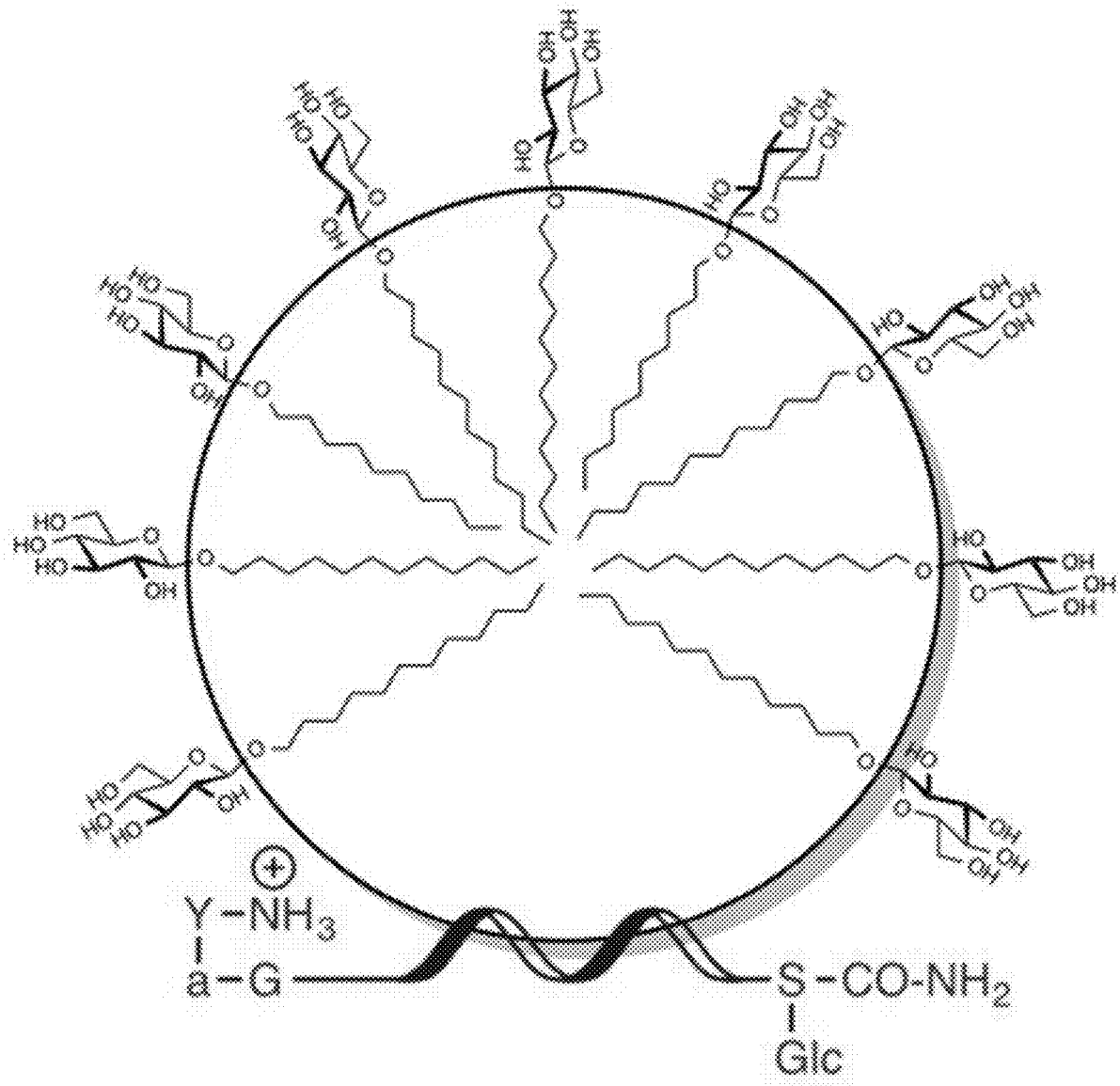
FIG. 1A shows a schematic of a micelle formed from glycolipids and glycopeptides

Glycolipid-based micelles and their inverted micelles that can self-assemble in both aqueous and non-aqueous environments are featured in the present invention. Normal primary alcohols octanol, decanol and dodecanol are glycosylated using the peracetates of glucose, melibiose and cellobiose using the minimally competent Lewis acid indium(III)bromide, and the resulting glycolipid surfactants are examined by DOSY NMR. Micelles may be seen as "membrane mimics" with a maximum positive curvature, while inverted micelles may be regarded as membrane mimics with the maximum negative curvature. Critical Micelle Concentrations (CMCs), aggregation numbers ($N_{agg}$) as well as micelle morphology may be assessed using experimentally observed diffusion rate constants. Aggregation in the "curvature=zero" state may also be observed by single crystal X-ray diffraction studies of crystals obtained from aqueous ($D_2O$) NMR samples.

Over 8.5 million metric tons of surfactants are produced annually; typically used as detergents and cleaning agents, additives for crop and food production; used as well as cosmetics, and in the pharmaceutical industry. Many of the commonly used sulfate and phosphate anionic surfactants show signs of toxicity, ranging from mild skin irritation in the individual user to habitat disruption with global effects. Glycolipids are of growing interest as "green" surfactants due to their lower toxicity, environmentally benign degradation, and availability from renewable sources. Recent studies involving a variety of glycolipids have focused on fundamental structure vs function relationships of the solution-based surfactants. Specifically, surface tensiometry, fluorescence quenching, and dynamic light scattering (DLS) experiments have been utilized to determine critical micelle concentrations (CMCs), aggregation number ($N_{agg}$), and micelle size and shape.

While most studies have focused on surfactants in aqueous solution, many surfactants in apolar media are capable of forming inverse micelles, often brought together with adventitious water in a hydrophilic core. Likewise, surfactants are key components of microemulsions, and are able to distribute oils into water (o/w) or water into oil (w/o) or other apolar media.

Diffusion-Ordered Spectroscopy (DOSY) is a pulse field gradient NMR technique that measures the spin-echo of a sample across a series of experiments. A 90° z-axis gradient is applied during each experiment to generate a helical field. After a period of diffusion ($\Delta$), an opposite 180° pulse at a time t 'unwinds' this field, and at time 2t a spin-echo is observed. Through the series of experiments, the z-axis gradient is increased, resulting in helical fields with increasingly tighter turns. Small species, like the surfactant monomers, will diffuse rapidly during A, causing a loss of convergence with the 180° pulse and subsequent depletion of the expected echo. Aggregated species are closer to their original position within the field, more accurately converging at time 2t, resulting in a stronger signal. This results in several spectra in which overall intensities are diminished sequentially with increasing gradient pulse strength. The diffusion coefficient ($D_c$) of a sample can be determined by solving:

$$I = I_0 e^{\left[-(\gamma g\delta)^2 D_c\left(\Delta - \frac{\delta}{3}\right)\right]}$$

where I is signal intensity, $\gamma$ is the gyromagnetic ratio of the nucleus, g is the gradient strength, $\delta$ is the gradient pulse interval, and $\Delta$ the diffusion delay time.

The use of DOSY to examine aggregate behavior provides a rapid technique to examine micelles in aqueous media, as well as reverse micelles in non-aqueous environments. Small sample sizes and automated sampling technologies facilitate bulk analysis with limited material, which is especially important for molecules of interest that pose synthetic challenges or require costly (e.g. isotopically labeled) starting materials.

Solution-phase data of a series of alkyl glucosides in their mixed anomeric forms, with alkyl chain lengths of 8, 10, and 12 carbons is provided. Aggregate size and packing predictions are calculated from experimental data and in silico calculations. Inverse micelle and microemulsion experiments with the alkyl glucosides in a chloroform/water/surfactant system are also examined.

EXPERIMENTAL

β-Peracetate Saccharides

β-Glucose peracetate was obtained commercially, as were the free sugars. Melibiose and cellobiose were converted to their corresponding β-peracetate derivatives by heating a suspension of the sugar in a 1:1 (v/v) mixture of $Ac_2O$ (10 eq)/$PhCH_3$ in the presence of 30 mol % KOAc. After 2-8 hrs at reflux conversion was complete as judged by TLC. Each mixture was cooled and washed 2× with $H_2O$, dried over $MgSO_4$ and evaporated to an oil, which was allowed to crystallize. Dilution of the oil with small amounts of dry hexanes sometimes aided crystallization. The solid could be recrystallized from EtOH to provide ~90% β-peracetate sugar (~10% a-anomer) in 50-70% overall yield.

Alkyl Glycoside Synthesis

Figure 6:
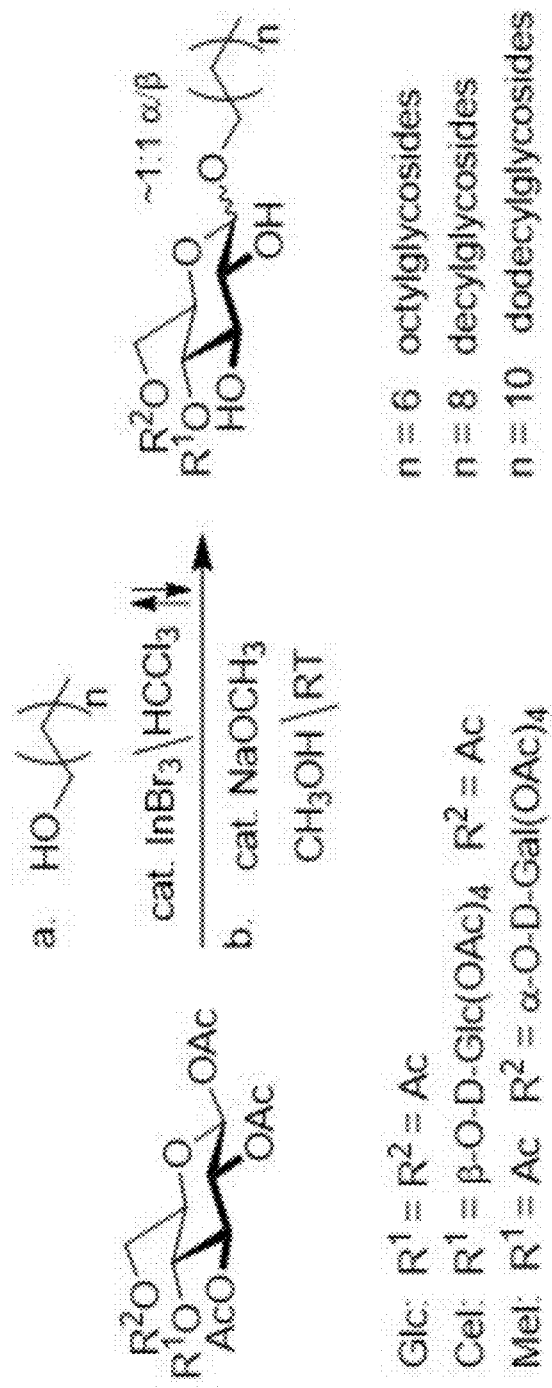
FIG. 6 shows: a) Alkyl glycosides (~1:1 anomeric mixtures) are synthesized from the corresponding β-peracetate sugars with InBr3 (III), a minimally-competent promoter that forms HOAc to regenerate the catalytic $In^{+++}$ species; and b) Zemplén procedure (cat NaOMe\MeOH) removed the acetate protection groups following SiO2 chromatography.

Octyl, decyl, and dodecyl glycosides were prepared as previously reported by $InBr_3$-promoted glycosylation (FIG. 6). Generally, to a suspension of the sugar peracetate in approximately 1:1 wt/v $CHCl_3$, 1.2 molar equivalents of the appropriate alkyl alcohol were added, followed by the addition of 10 mol % $InBr_3$. After 16-24 hrs at reflux, the solution was cooled, and a small amount of $Ac_2O$ added to re-acylate any free OH groups. The acetates were purified by $SiO_2$ column chromatography, first washing with hexanes to remove apolar impurities and HOAc, then eluting with 2:8 EtOAc/hexanes for monosaccharides and 3:7 EtOAc/hexanes for the more polar disaccharides. The pure acetates were deacylated under Zemplén conditions (cat. NaOMe in MeOH) and recovered via lyophilization from $H_2O$ to provide colorless white solids in ~1:1 anomeric mixtures in 50-80% yield based on the peracetate starting material.

Diffusion-Ordered Spectroscopy

NMR samples were prepared in triplicate by diluting concentrated stock solutions of the alkyl glycoside or SDS in $D_2O$ to concentrations below the known or estimated CMC values. For highly concentrated and/or insoluble samples, vials were warmed in an oil bath until the solution formed and was clear and cooled to RT. Precipitated samples were measured both before and after filtration of the precipitate to observe diffusion behavior. Solutions of the three glucosides were also prepared from 100 mM stock solutions of the glycolipid in dry $CHCl_3$, with addition of $D_2O$ to aid solubility and aggregation. Soluble samples were analyzed to determine behavior in apolar conditions.

Sample solutions were transferred (500 µL) to 5 mm NMR tubes for automated analysis via Bruker 400 MHz spectrometer. Gradient pulse strengths and delays were standardized for all experiments, with a pulse interval ($\delta$) of 3 ms and diffusion interval ($\Delta$) of 200 ms; these values were experimentally determined to ensure the arrayed diffusion data would provide a reasonable curve for accurate $D_c$ determination.

CMC Determination and Structural Predictions

Stacked data arrays were processed in MestReNova® by setting the appropriate value "k" standardized to known self-diffusion coefficients of the bulk solvent, then applying Bayesian DOSY transform to yield pseudo-2D spectra containing the $^1$H NMR spectrum vs diffusion coefficients. Averaged values for samples at each concentration were plotted vs. the inverse concentration. Data points from monomeric and aggregated samples were identified by the first signs of decreasing $D_c$, and linear regression of the two sets provided an intercept estimated as the CMC. Slope and intercept errors were used to calculate error.

The Stokes-Einstein equation provided estimated aggregate radii from the recorded diffusion coefficients. Further, Tanford's equations: $l_c \leq l_{max} \approx (0.154+0.1265n)$nm and $v \approx (27.4+26.9n) \times 1.0^{-3}$ nm$^3$ were used to calculate the critical volume (v) and maximum length ($l_{max}$) of the hydrocarbon tail based on the length of the lipid tail, n. Energy-minimized structures in MOE® were measured to find critical length ($l_c$) values.

The structures were rotated to represent a top-down view of the headgroup, and ImageJ© used to select and calculate average headgroup areas ($a_0$). To predict aggregate shapes, $P_c = v/a_0 l$ was used to calculate packing parameters ($P_c$) for each molecule where values less than ⅓ presume micellular solutions, moving up to ellipsoidal structures and cylindrical rods at ½. $P_c$ values≈1 represent larger ordered aggregates such as bicelles, vesicles, and eventually bilayers.

Results and Discussion

Glycolipid CMC's in D$_2$O

Figure 7:
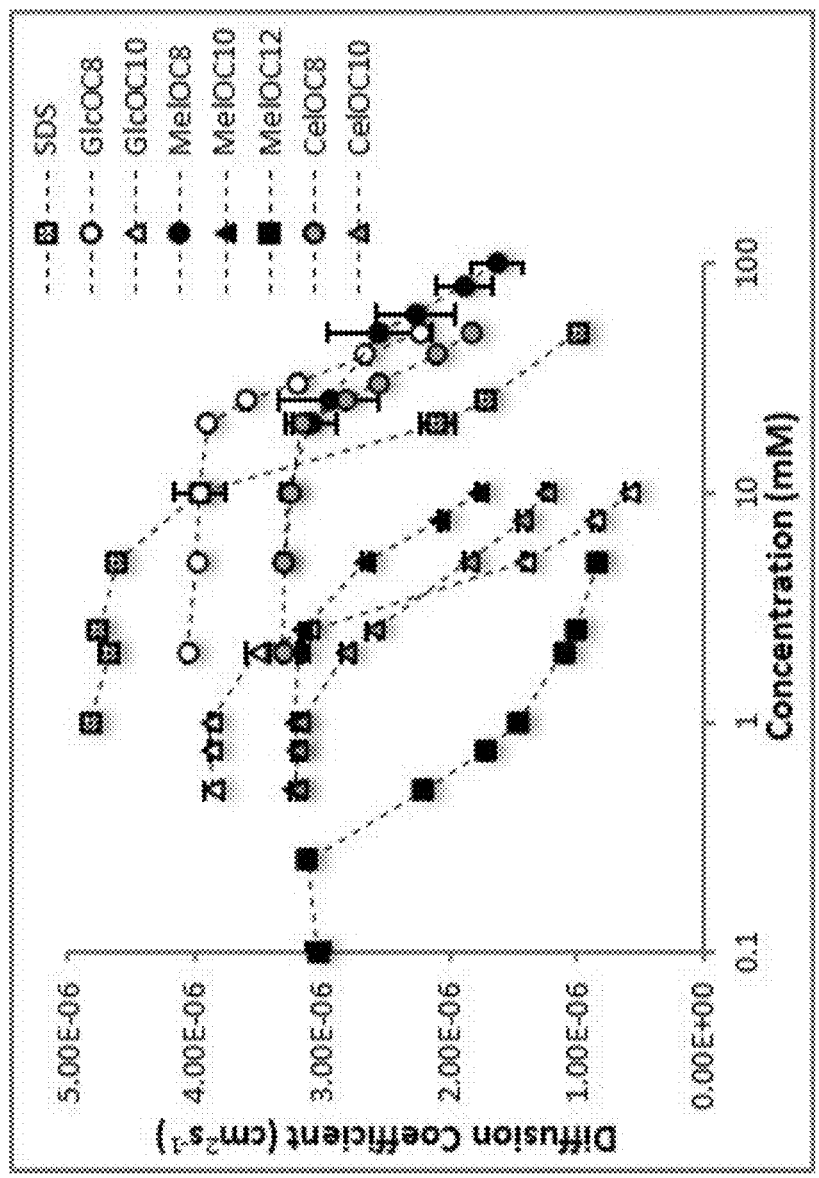
FIG. 7 shows CMC curves for octyl, decyl, and dodecyl glycosides of glucose, melibiose, and cellobiose determined by DOSY measurements.

Diffusion coefficients for each of the glycolipid samples are shown in FIG. 7. Linear regression of the data sets, i.e. monomers and aggregates, provided an intercept estimated as the CMC. These results and other corresponding data are found in Table 1. CMC's decreased approximately a full order of magnitude when the hydrocarbon chain length increased by two methylene groups as described previously.

CMC measurements from DOSY experiments agree with previously reported surface tensiometry data for melibiosides and cellobiosides, as well as literature values for the glucosides. Each set of glycosides indeed retained unique aggregation properties from the others, indicating that headgroup structure, not only tail length, may help define aggregation.

In general, the disaccharide-based glycolipids show increased water solubility compared to the glucosides. The solubility of most glycolipids observed in this study was noticeably reduced in D$_2$O relative to H$_2$O. It is known that as a bulk solvent, D$_2$O has slightly stronger hydrogen bonding interactions than H$_2$O, which could in effect increase solvent polarity and consequently decrease the solubility of the more hydrophobic molecules. It was exceptionally evident in the case of dodecyl glucoside which remained insoluble and unable to provide useful NMR data after processing.

Figure 8:
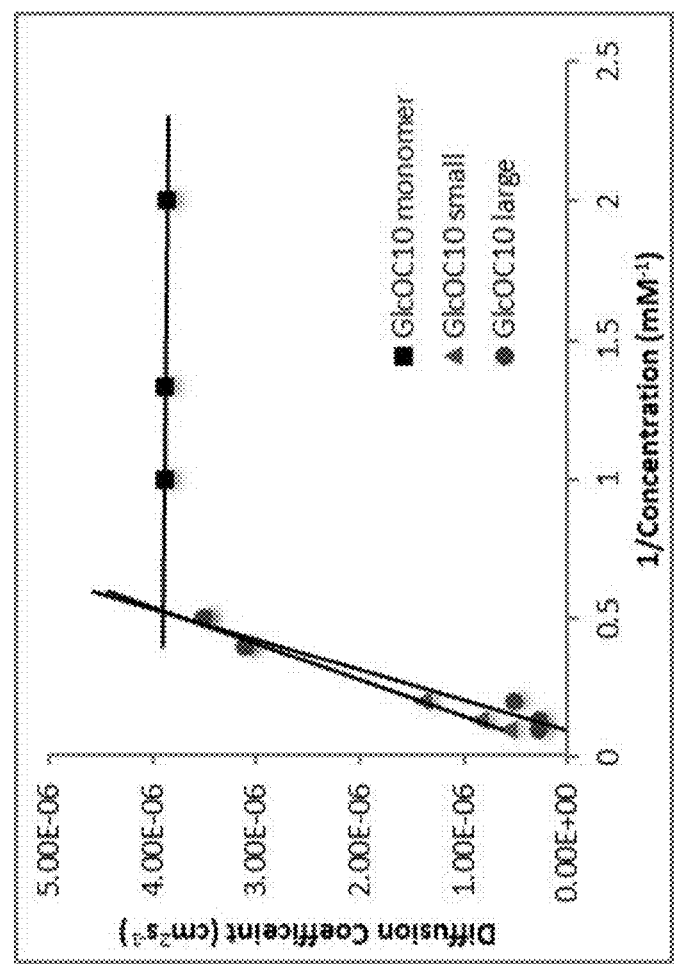
FIG. 8 shows linear regression of the diffusion coefficients for multiple species vs. $C^{-1}$ is used to calculate CMC values. For decyl glucoside, separate values for "small" 40 Å radius aggregates and "large" 90 Å aggregates provide linear regression to nearly the same intercept with monomer samples, reflecting minimal changes in CMC regardless of the measured aggregate.

Decyl glucoside precipitated at concentrations barely above the CMC, though analysis of the samples containing precipitate provided unique data in that both a large and a small aggregate species could be observed. This result was unexpected given the time scale of the experiment and rapid equilibrium between monomers and multimers. Multiple analyses show minimal difference with the calculated CMC value, regardless of which aggregate was measured (FIG. 8). We suspect this result is due to the formation of stable, rod-like aggregates in the presence of smaller ellipsoidal micelles.

Octyl glucoside was also observed to precipitate and crystallize in D$_2$O, even at concentrations barely above the CMC. This effect was accentuated in samples with higher $\alpha:\beta$ ratios, with the slightly less polar $\alpha$-glycoside precipitating. The alpha anomer is known to have a more stable crystal lattice, explaining its selective crystallization. In general, the increased strength of O-D hydrogen bonding interactions both appears to decrease the observed CMC and increase aggregation numbers and hydrodynamic radii, especially in non-ionic samples. We observed the dissolution of NaCl to glycolipid solutions also led to similar precipitation. This result was repeated in several buffer solutions and affected molecules with the glucose headgroup exceptionally more than those with disaccharide head groups, suggesting that the disaccharide headgroups are a major solubilizing factor and possibly that interactions among the headgroups may help stabilize aggregates.

Table 1 shows DOSY CMC results and packing predictions of SDS and alkyl glycosides in D2O. Values from Tanford's equations and modeling measurements are shown. Respective packing predictions were calculated using $l_c$ and $l_{max}$ using areas calculated from energy minimized MOE modeling.

TABLE 1

| Compound | CMC (mM) | $l_{max}$ (Å) | $l_c$ (Å)[23] | $V_{calc}$ (Å$^3$) | $a_0$ (Å$^2$) [MOE, ImageJ] | $a_0$ (Å$^2$) [Lit.] | *Packing$_a$ | *Packing$_b$ | Predicted Shape |
|---|---|---|---|---|---|---|---|---|---|
| SDS | 8.5 ± 1.7 | 16.7 | 14.8 | 350.2 | 47 | 61 | 0.50 | 0.45 | Ellipsoid |
| Octyl Glucoside | 22.5 ± 2.4 | 11.7 | 9.7 | 242.6 | 37 | 42 | 0.67 | 0.56 | Ellipsoid |
| Decyl Glucoside | 1.9 ± 0.9 | 14.2 | 12.2 | 296.4 | 40 | 42 | 0.61 | 0.53 | Ellipsoid |
| Dodecyl Glucoside | †nd | 16.7 | 14.7 | 350.2 | 37 | 34 | 0.65 | 0.57 | Ellipsoid |
| Octyl Melibioside | 39.9 ± 5.2 | 11.7 | 9.7 | 242.6 | 68 | 73 | 0.37 | 0.31 | Sphere |
| Decyl Melibioside | 3.9 ± 0.1 | 14.2 | 12.2 | 296.4 | 71 | 68 | 0.34 | 0.29 | Sphere |
| Dodecyl Melibioside | 0.3 ± 0.00 | 16.7 | 14.7 | 350.2 | 63 | 51 | 0.38 | 0.33 | Sphere |
| Octyl Cellobioside | 19.7 ± 2.2 | 11.7 | 9.7 | 242.6 | 58 | 50 | 0.43 | 0.36 | Sphere |
| Decyl Cellobioside | 1.8 ± 0.3 | 14.2 | 12.3 | 296.4 | 62 | 50 | 0.39 | 0.34 | Sphere |
| Dodecyl Cellobioside | †nd | 16.7 | 14.7 | 350.2 | 55 | 49 | 0.43 | 0.38 | Sphere/Ellipsoid |

†CMCs not determined due to low solubility in D$_2$O. The C$_{12}$ glycolipids have CMCs below the limit of detection by NMR.

Micellar Structure

Calculations from MOE® and ImageJ® are shown above in Table 1, along with calculated packing parameters and predicted aggregate shapes. Notably, values for SDS and the glucosides predict ellipsoidal aggregates, and all disaccharides are expected to remain roughly spherical. These results match nicely to previously reported measurements. Dodecyl cellobioside remained the exception, with packing parameters suggesting the potential for ellipsoidal structures. All the glucosides behaved similarly in 0.9% NaCl to what was observed in $D_2O$, with precipitation (turbidity) observed at concentrations barely above the estimated CMC's. The disaccharides, on the other hand, showed much greater tolerance to salt solutions or buffers and remained soluble at all observed concentrations (up to 100 mM). Increased $a_0$ in the melibiosides likely explains higher solubility and CMCs, compared to the cellobiosides. For example, the increased solubility of dodecyl melibioside compared to dodecyl cellobioside is likely due to the 1→6 alpha linkage in melibiose, which is more flexible, producing a larger hydrodynamic volume than the hindered 1→4 linkage in cellobiose.

Figure 9:
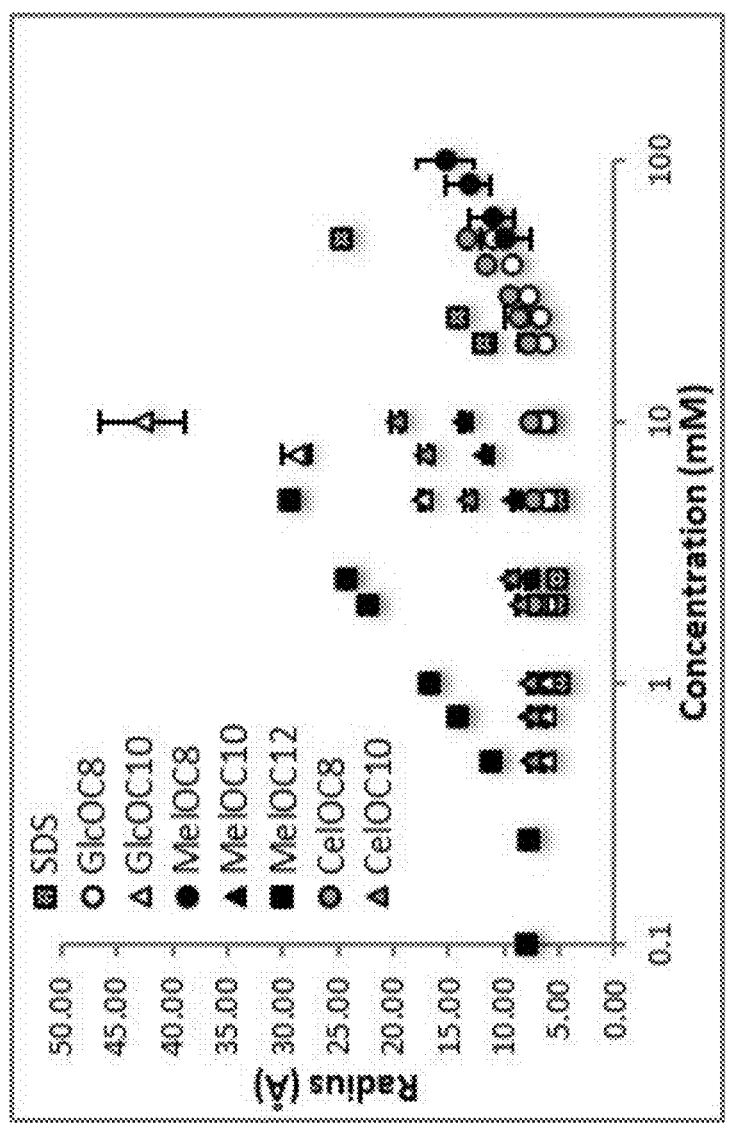
FIG. 9 shows average calculated radii from diffusion data show with larger-order values excluded.
Figure 10:
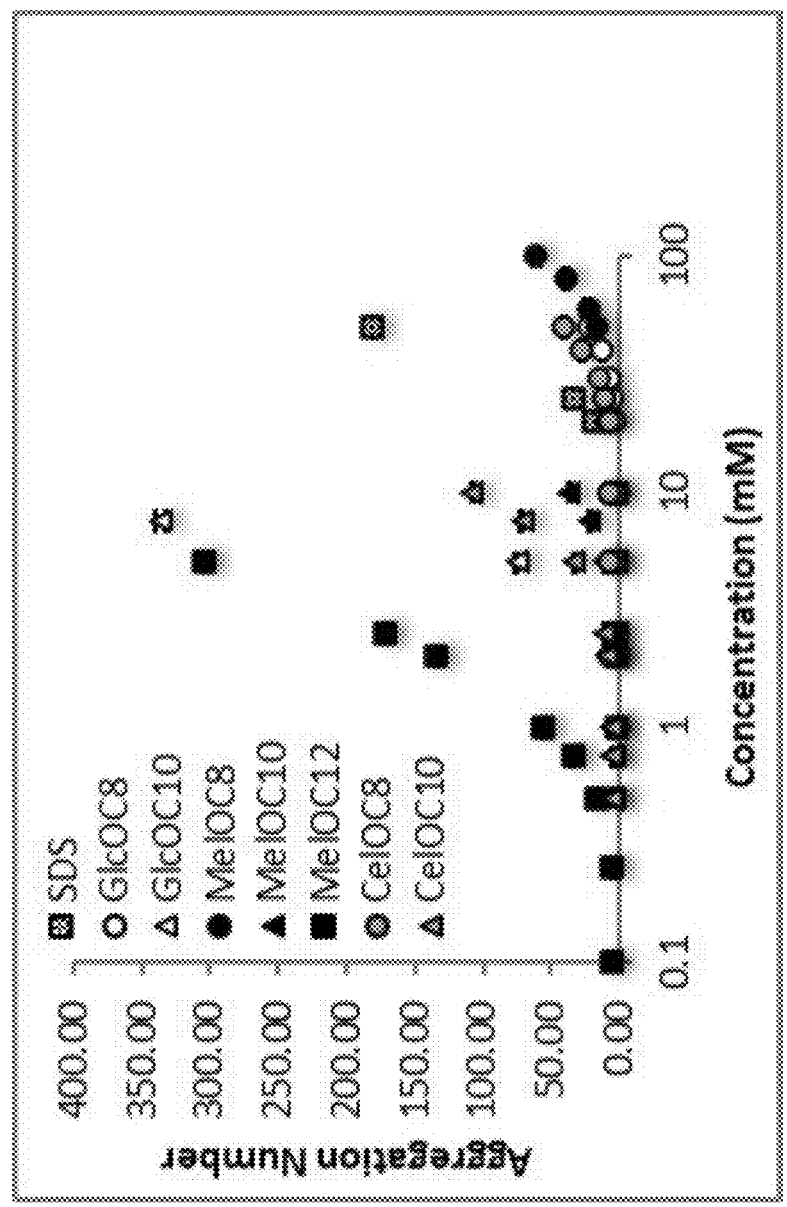
FIG. 10 shows $N_{agg}$ calculations for compounds such as dodecyl melibioside and decyl glucoside show higher-order aggregates, likely ellipsoid-tubular structures.

The average micelle radius (r) was calculated for each concentration of the surfactants (FIG. 9). Using molecular volume (V) calculations from MOE®, a spherical model was used to estimate aggregation numbers ($N_{agg}$) for each sample (FIG. 10). In general, these values correspond well to values determined by fluorescence quenching experiments. For samples such as decyl glucoside and dodecyl melibioside, $N_{agg}$ values greater than 200 are representative of both the fact that larger aggregates will form at high concentrations, and that $D_2O$ (and 0.9% NaCl in $H_2O$) induces the formation of higher order structures. Dodecyl melibioside is an example, where previous fluorescence quenching experiments show $N_{agg}$ averages at 65 in concentrations over 20 mM. For these DOSY experiments $N_{agg}$ is above 300 at only 5 mM, over an order of magnitude greater, and more likely describing rod-like aggregates.

Figure 11:
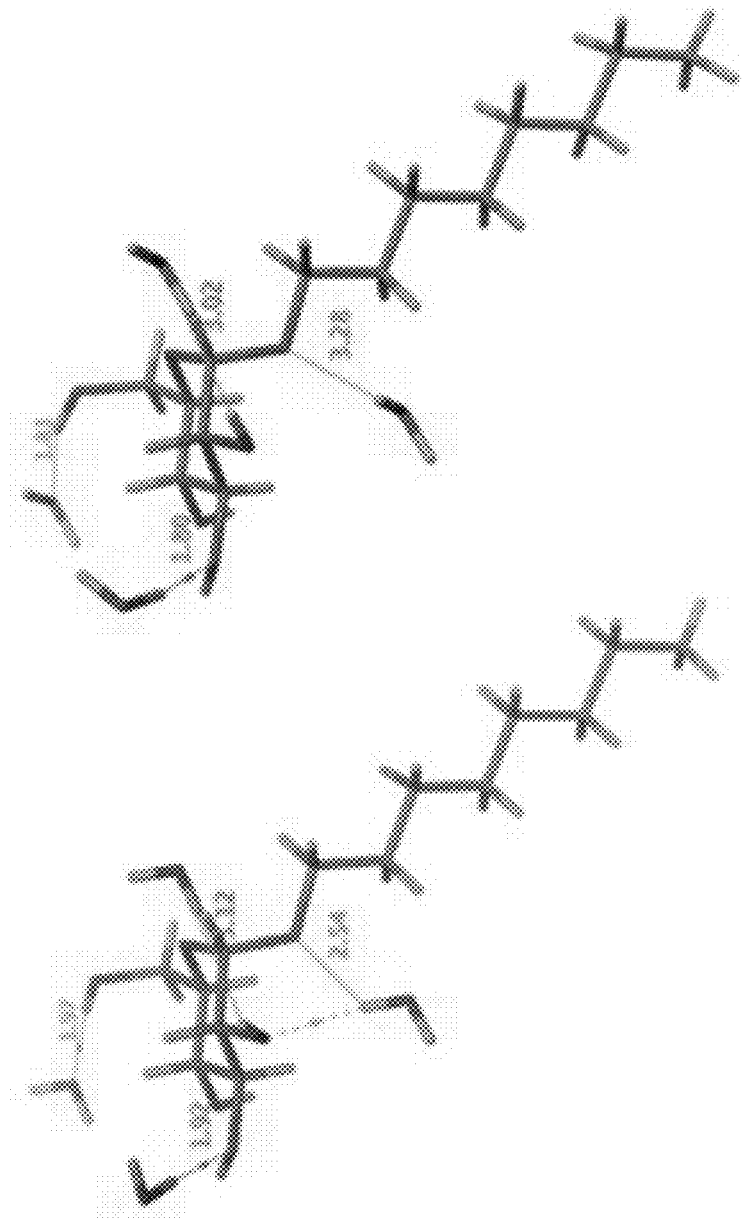
FIG. 11 shows crystal structures from $D_2O$ (left) and $H_2O$ (right) with measurements of potential H-bonding among surrounding molecules.
Figure 12:
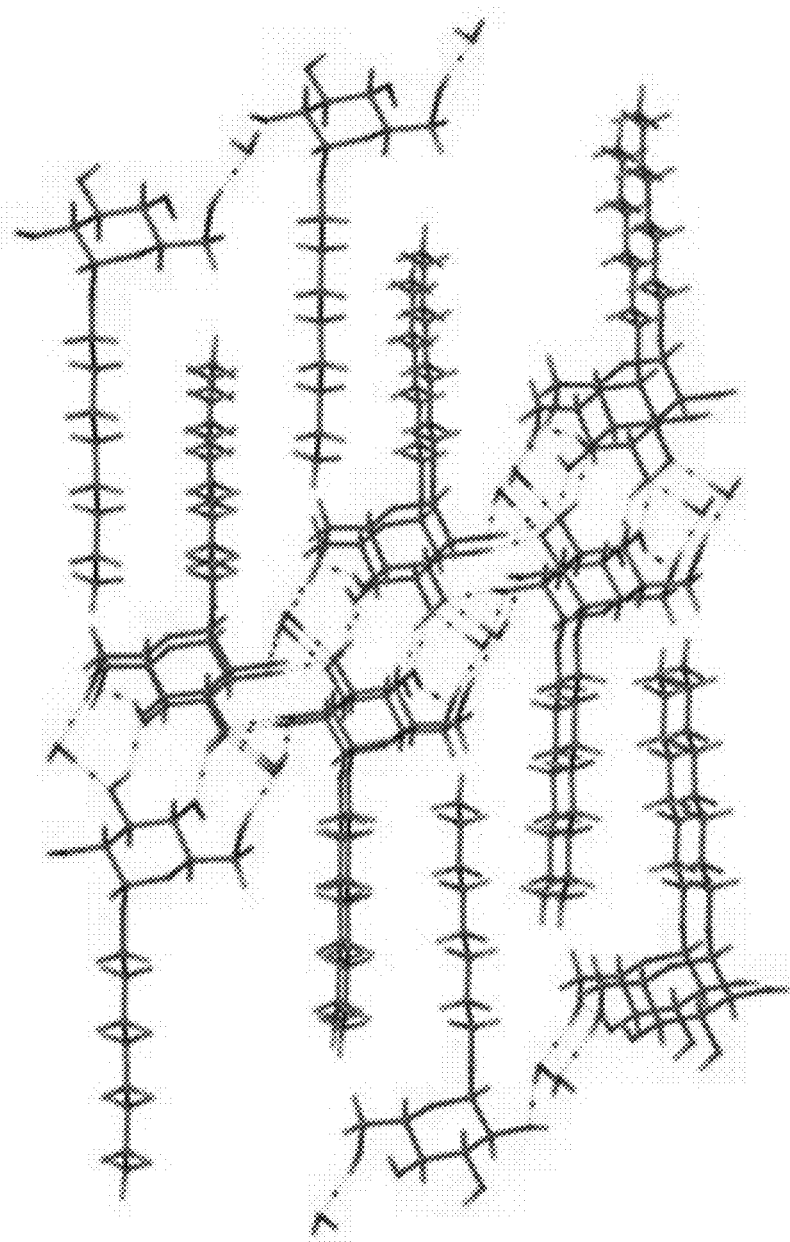
FIG. 12 shows supramolecular structures of α-octyl glucoside from $D_2O$ (top) and $H_2O$ (bottom). Opposing headgroups form a decalin-like hydrogen bonding network between 3- and 4-positions, with neighboring headgroups bridged from 2- and 6- with a single water molecule between each.

Single-crystal X-ray data was collected from a crystal of the α-octyl glucoside obtained from a $D_2O$ stock solution. FIG. 11 compares the data with a previously reported structure, which was crystallized from pure $H_2O$. Measurements taken from MOE® show only a slight difference in the orientation of surrounding water molecules and OH/OD groups.

Of particular interest is the hydrogen bonding among the carbohydrate headgroups within the crystal structure. Considering the role the headgroups play in aggregation, cooperation among the sugars within glycolipid micelles would stabilize the micelles, as opposed to the repulsion expected in ionic surfactants. Adjacent glucose units within each layer of the crystal structure are bridged by a single water molecule between the 2 and 6 hydroxyls, with the 3 and 4 hydroxyls of two opposing headgroups forming a 10-membered hydrogen bonding network, among other notable interactions. These results suggest that as opposed to repulsion forces present at the surface of ionic surfactant micelles, glycolipid micelle stability is likely aided by favorable hydrogen bonding among sugars at the surface.

Also of interest is the "trapped" $H_2O$ molecules within the headgroup layers. The formation of the hemihydrate further suggests that the structures are highly stabilized even without the presence of water. This may also help explain the presence of high-order glycolipid aggregates that are detectable at low concentration, where only smaller micelles are expected.

Inverse Micelles in $DCCl_3$

Hydrogen bonding allows water to interact favorably among the headgroups, stabilizing aggregate structures. This is evident from the solubility behavior of the glucosides in organic solvent, which were quite insoluble until the addition of small amounts of water. Even though the formation of inverse micelles is considered unfavorable with these compounds, i.e. the packing parameters are below 1, water appeared to drive solubilization of the surfactants.

Figure 13:
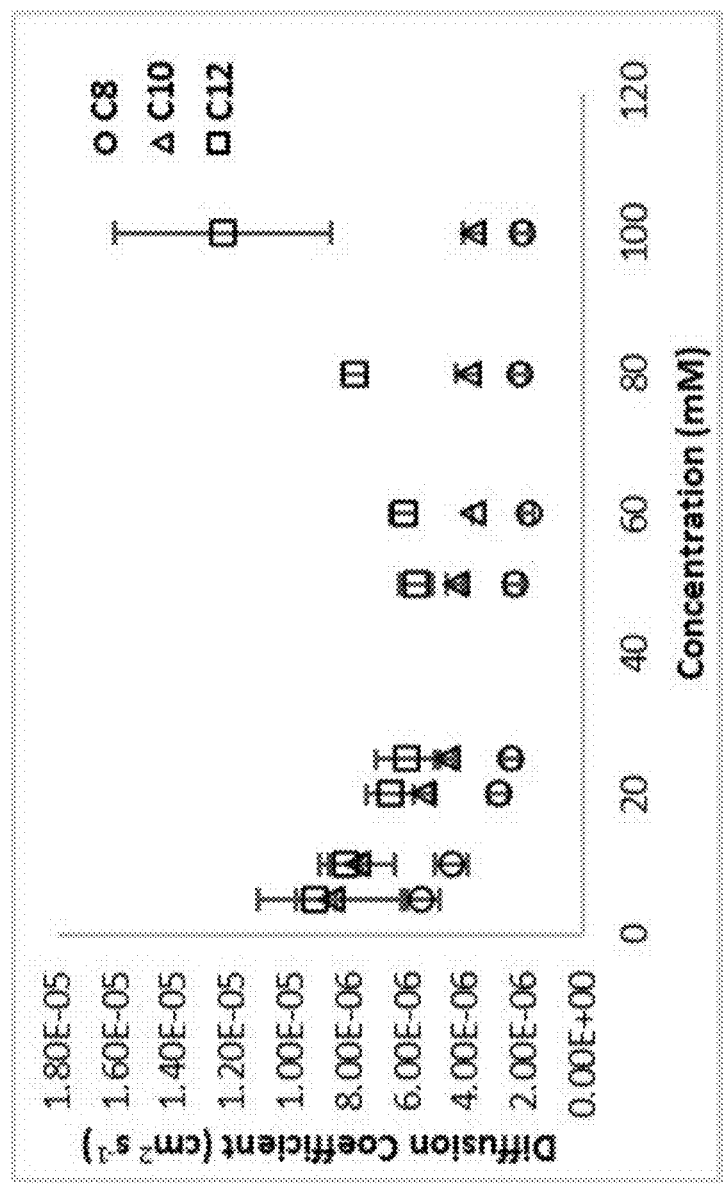
FIG. 13 shows diffusion coefficients of the three glucosides in $DCCl_3$ with 10 μL/mL of $D_2O$ added. Aggregates of the octyl and decyl glucoside seem to saturate, or possibly form emulsions while dodecyl glucoside appears to present as smaller aggregates at high concentrations.
Figure 14:
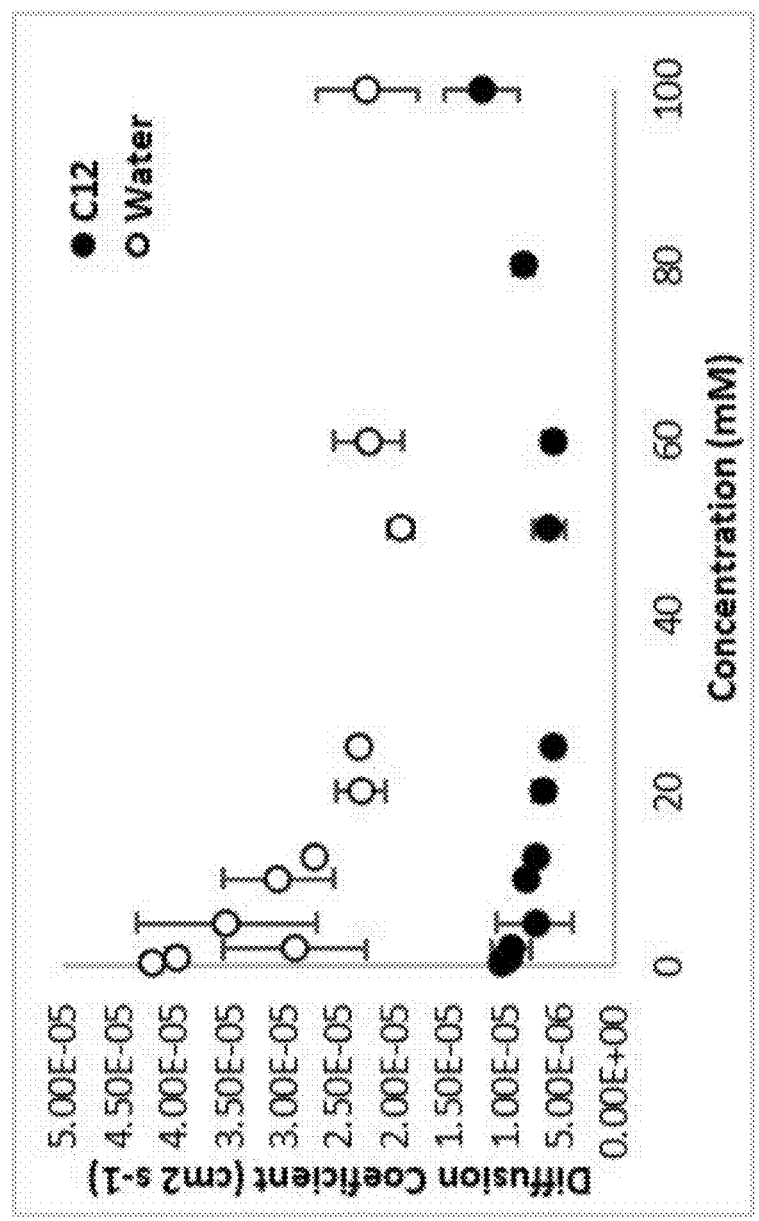
FIG. 14 shows data recorded from dodecyl glucoside, showing what appears to be aggregate formation with inclusion of water, followed by an apparent reduction in aggregate size.

Solutions of the glucosides were prepared ranging from 5-100 mM of the surfactant in dried $CDCl_3$ after the addition of 4-10 μL/mL $D_2O$. The curves (FIG. 13) show the diffusion coefficients recorded for samples containing 10 μL of $D_2O$ as surfactant concentration increases, and provide a representative trend seen across all samples. At low surfactant concentrations, water molecules should solubilize the surfactant headgroups, forming aggregates which grow with increased surfactant concentration, decreasing the diffusion coefficient. As seen in FIG. 14, $D_c$ for both surfactant and water decrease with increasing surfactant concentrations. This suggests cooperation between the two and that larger species on average are forming Interestingly, dodecyl glucoside aggregates diffused more rapidly at high concentrations, whereas the shorter chain glycosides remained relatively stable. At concentrations greater than 50 mM in $DCCl_3$, the diffusion coefficients of dodecyl glucoside begin to increase, suggesting the aggregates are becoming smaller. Concurrently, $D_{HOD}$ appears to remain steady, suggesting a possible phase transition, likely involving emulsion-like behavior. As this occurs with longer chained surfactants, the larger lipophilic surface area of the molecule could increase the solubility in organic solvent, and would exclude more molecules from the aggregates during self-assembly. The net increase in hydrogen bonding throughout inverse micelles may also result in an apparent decrease in $D_{HOD}$.

Small aggregates are measured in samples with low $D_2O$:surfactant ratios, which grow as the ratio increases. Without a large excess of water, this fits a model where surfactant molecules are solubilized as inverse micelles with headgroups in an aqueous core, which swells with additional water. When the molar ratio of $D_2O$:Surfactant moves near and above 15, the recorded diffusion coefficients generally stabilize. This is likely evidence of a microemulsion transition.

Disaccharide-based glycolipids were also prepared similarly to the glucoside samples, but generally remained insoluble despite the presence of water. Sonication and heat aided solubility, but precipitate re-formed upon cooling in most cases. Occasionally the formation of gel-like matrices occurred but, though interesting, did not persist after disturbance. Given the solubility issues, melibiosides and cellobiosides were not recorded in non-aqueous conditions.

Data for both solvents support the understandings of surfactant aggregation and dissolution. Further, DOSY NMR provides a rapid method to determine the diffusivity of an aggregate solution, which can be interpreted to determine detailed information about the physical and chemical properties of the molecules in question. For structure-function studies, it offers great utility for small molecule libraries. Comparing mono- and disaccharides, results from both experiments point to the importance of water within the hydrodynamic radius of a micelle as well as the strong cooperation of the carbohydrate headgroups of the surfactants. This cooperation likely leads to the observed behaviors in chloroform, which shows the glucose-based surfactants in particular to solubilize and participate in complex mixtures.

Figure 2:
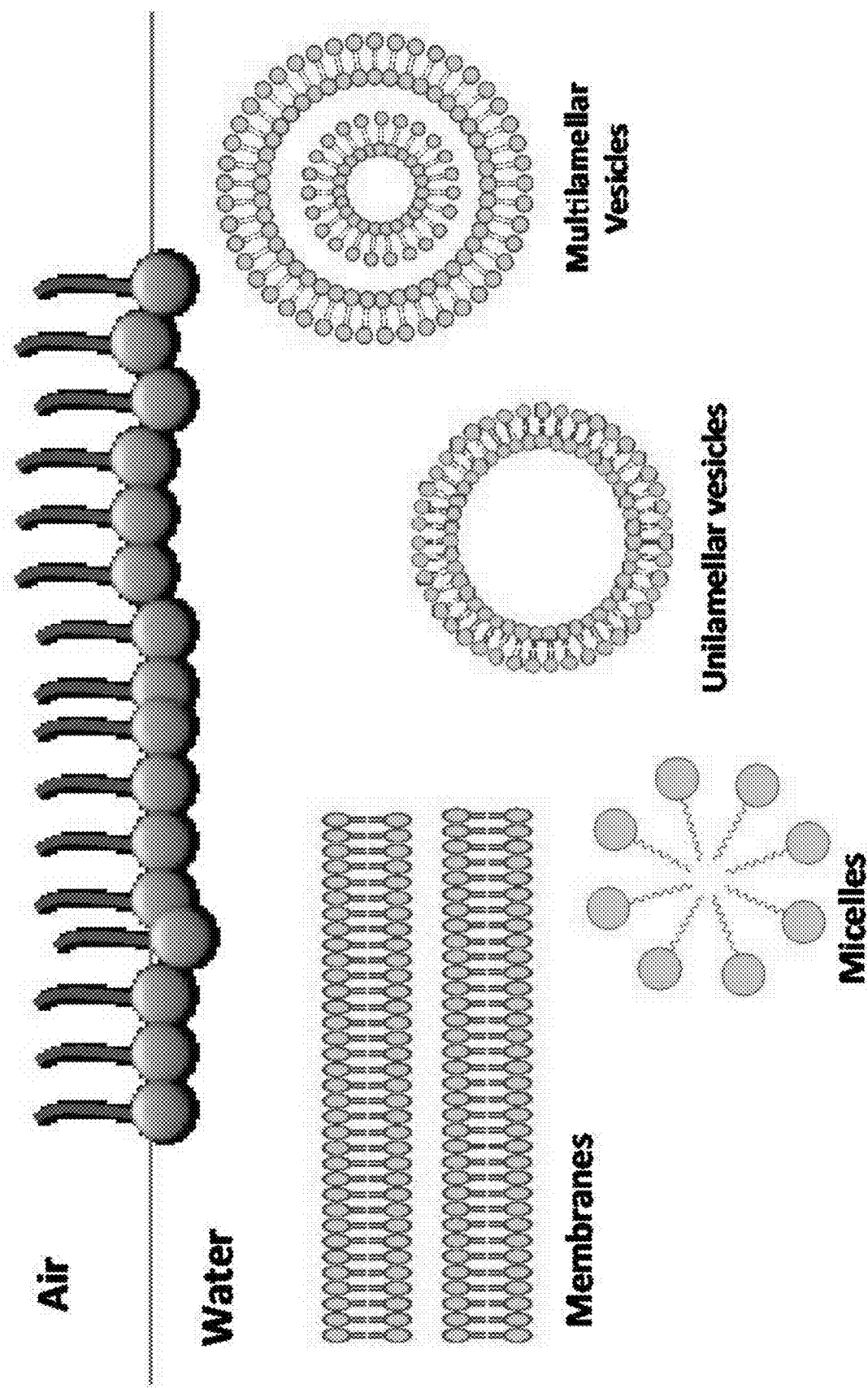
FIG. 2 shows an illustration of surfactant assembly architectures
Figure 3:
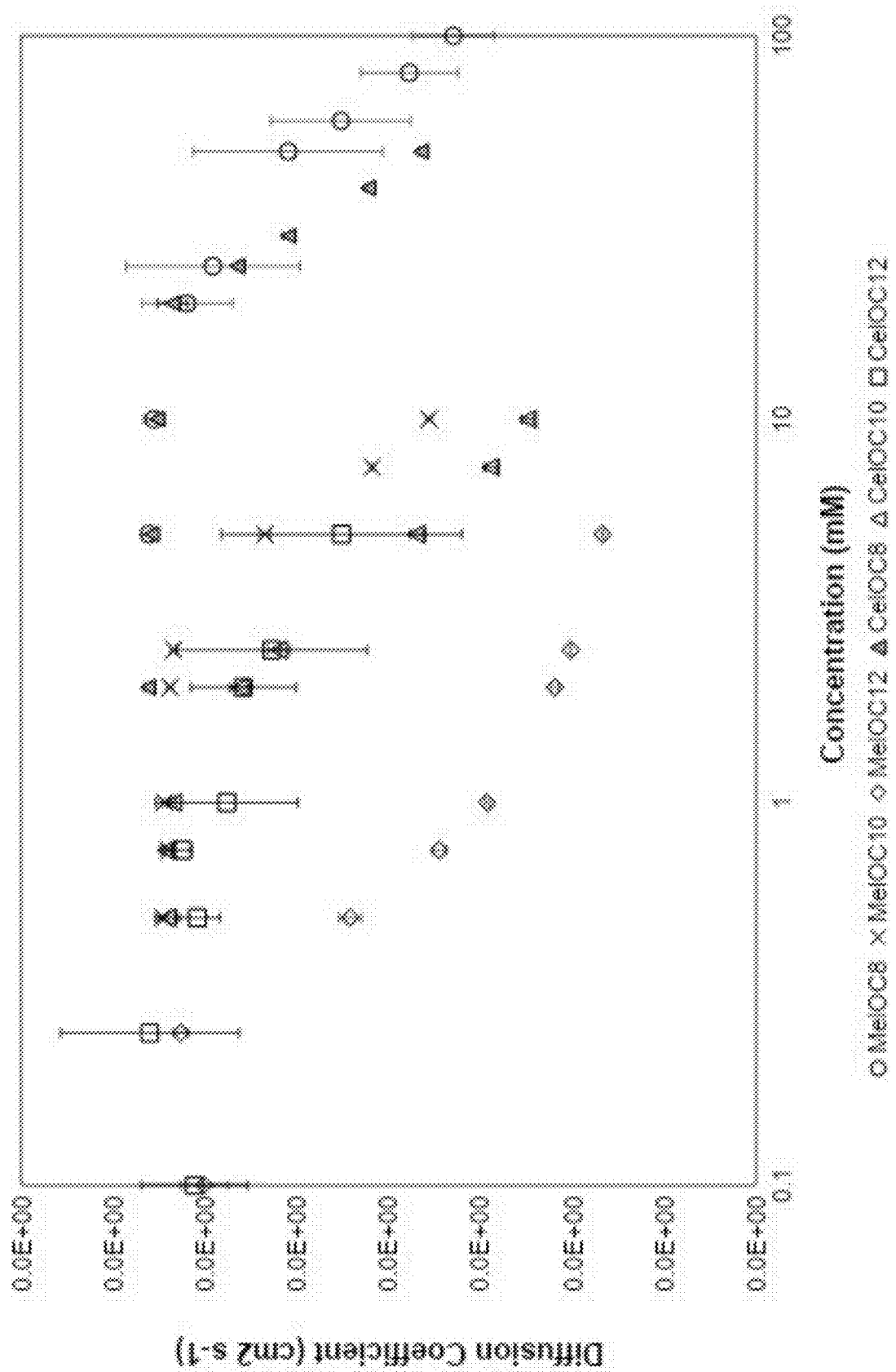
FIG. 3 shows a plot of diffusion coefficients vs. concentration for various glycolipids.
Figure 4A:
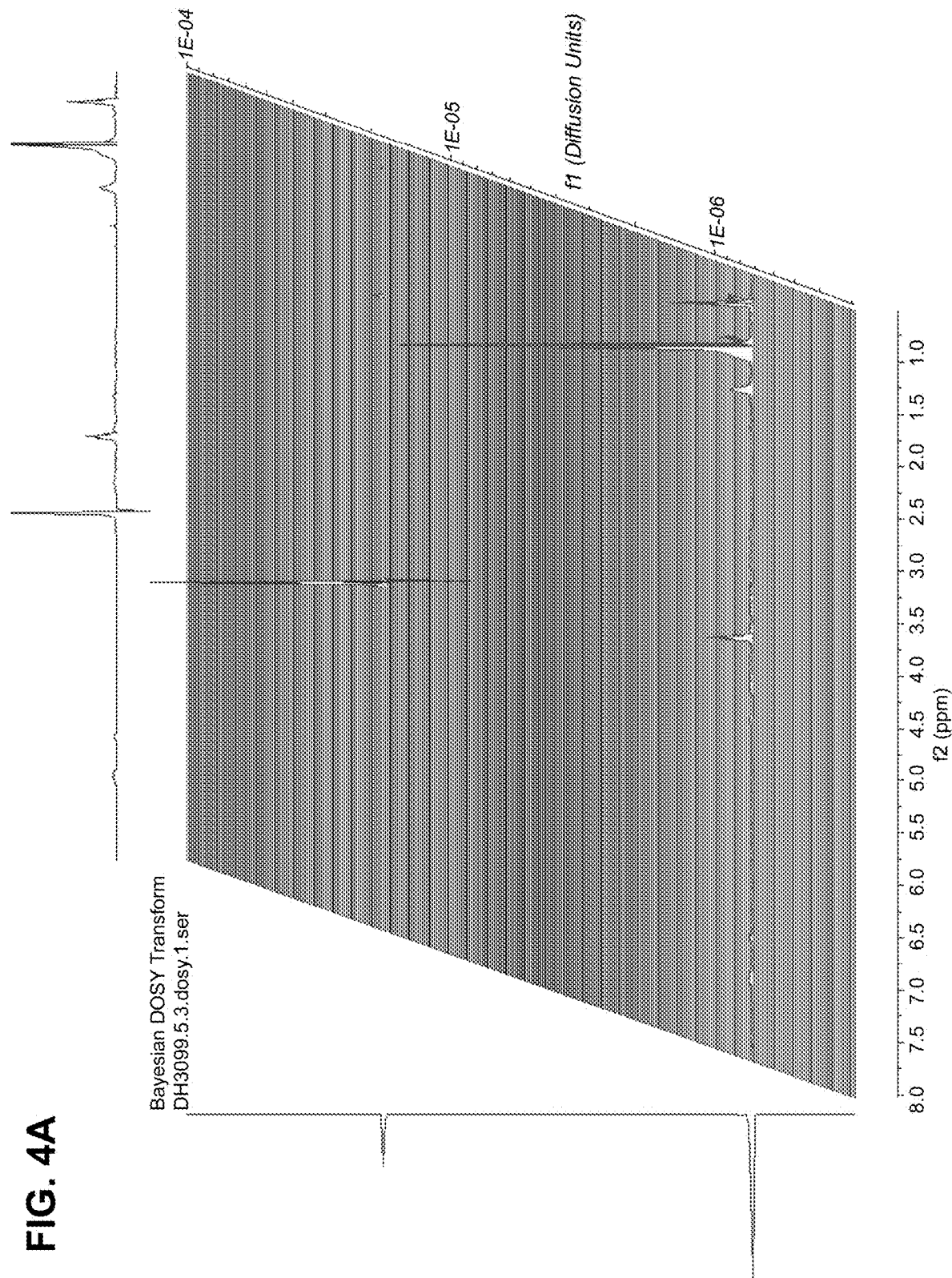
FIG. 4A shows a DOSY plot of diffusion coefficients of micelles formed from lactomorphin and SDS surfactants.
Figure 4B:
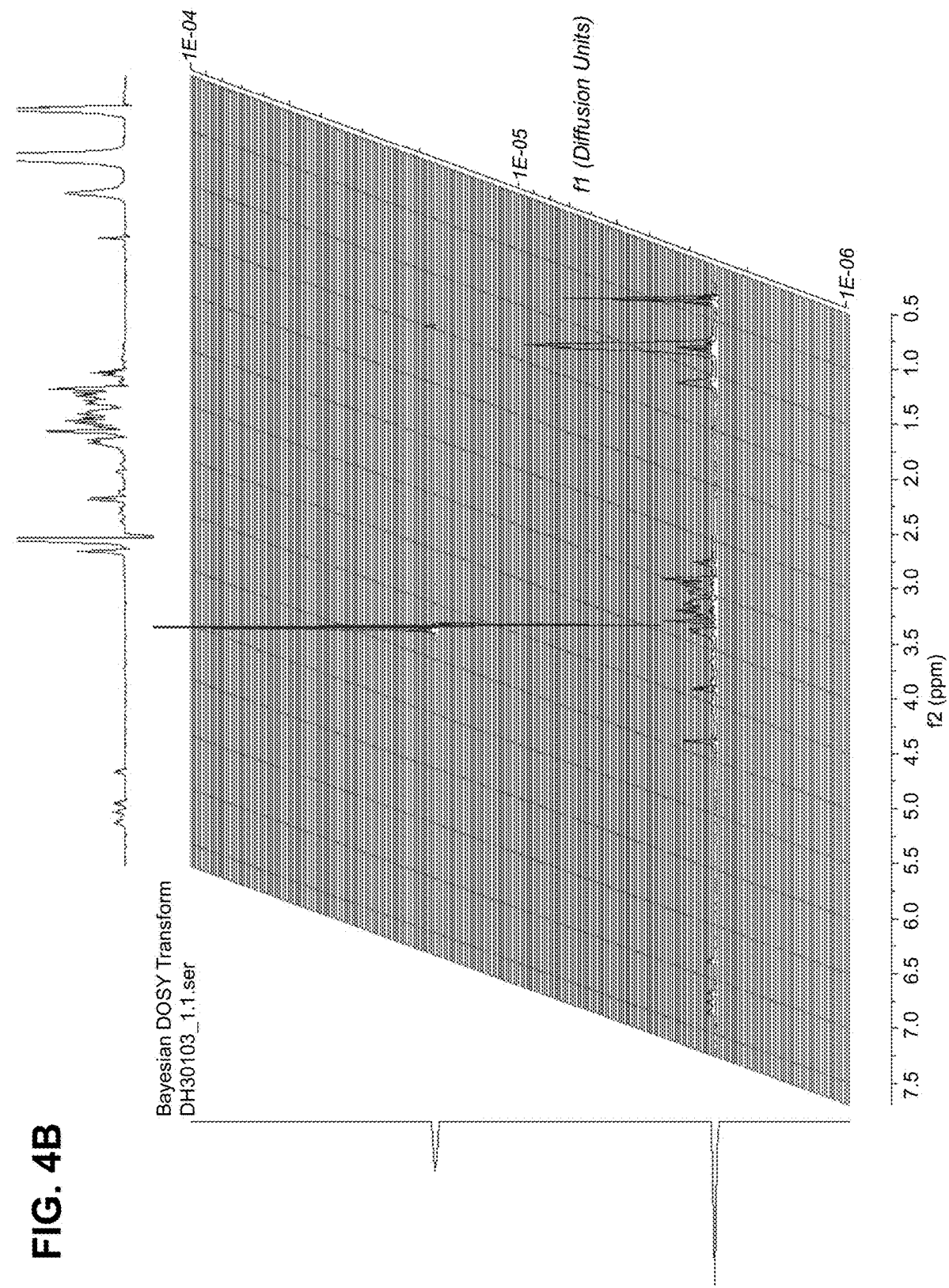
FIG. 4B shows a DOSY plot of diffusion coefficients of micelles formed from lactomorphin and octyl glucoside surfactants.
Figure 5A:
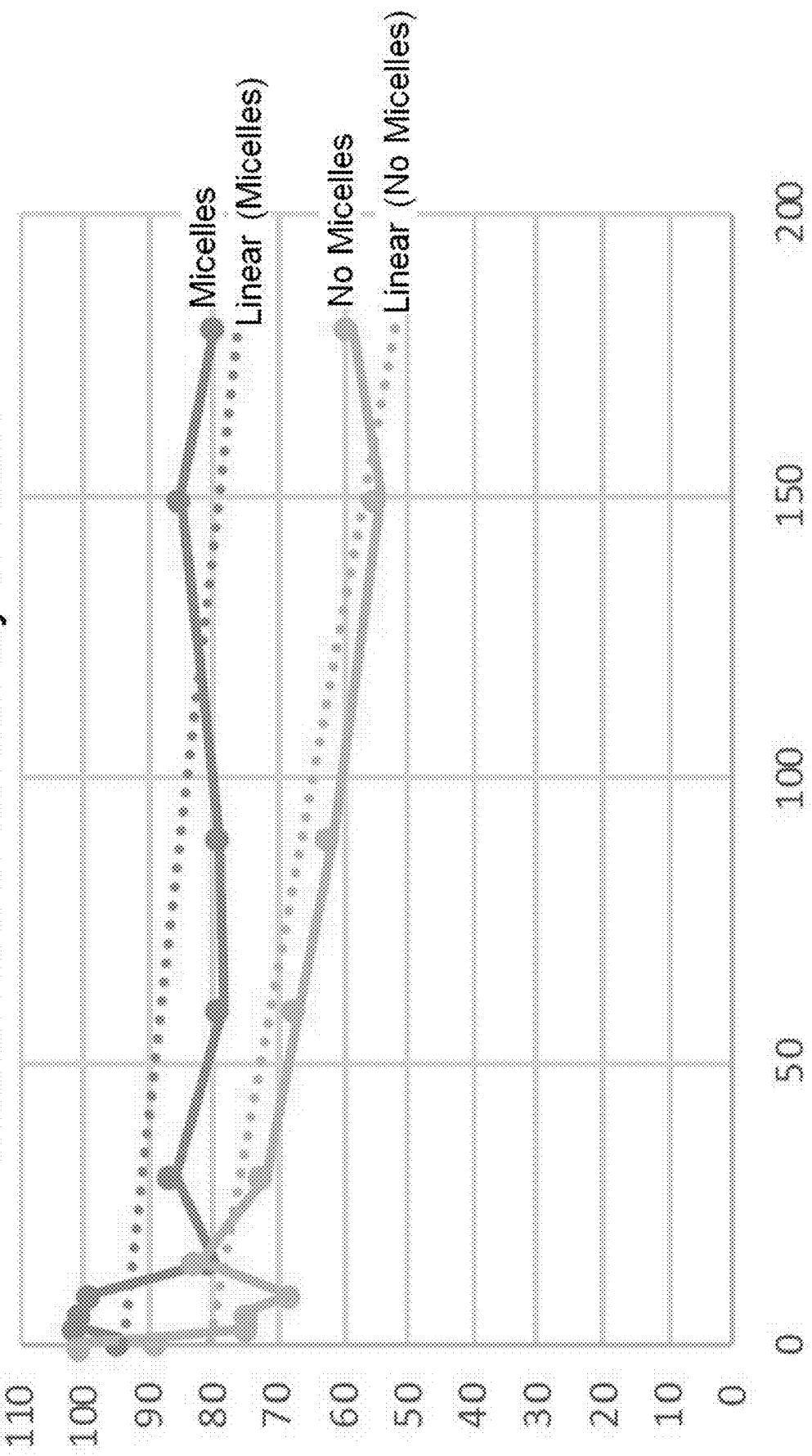
FIG. 5A shows the percentage of MMP-2200 remaining in 0.1% trifluoroacetic acid in water over time (minutes) in the presence and absence of decyl glucoside. The normalized signal (percent) is plotted vs. time (minutes). The micelles show a slower rate of degradation when compared to the control in water.
Figure 5B:
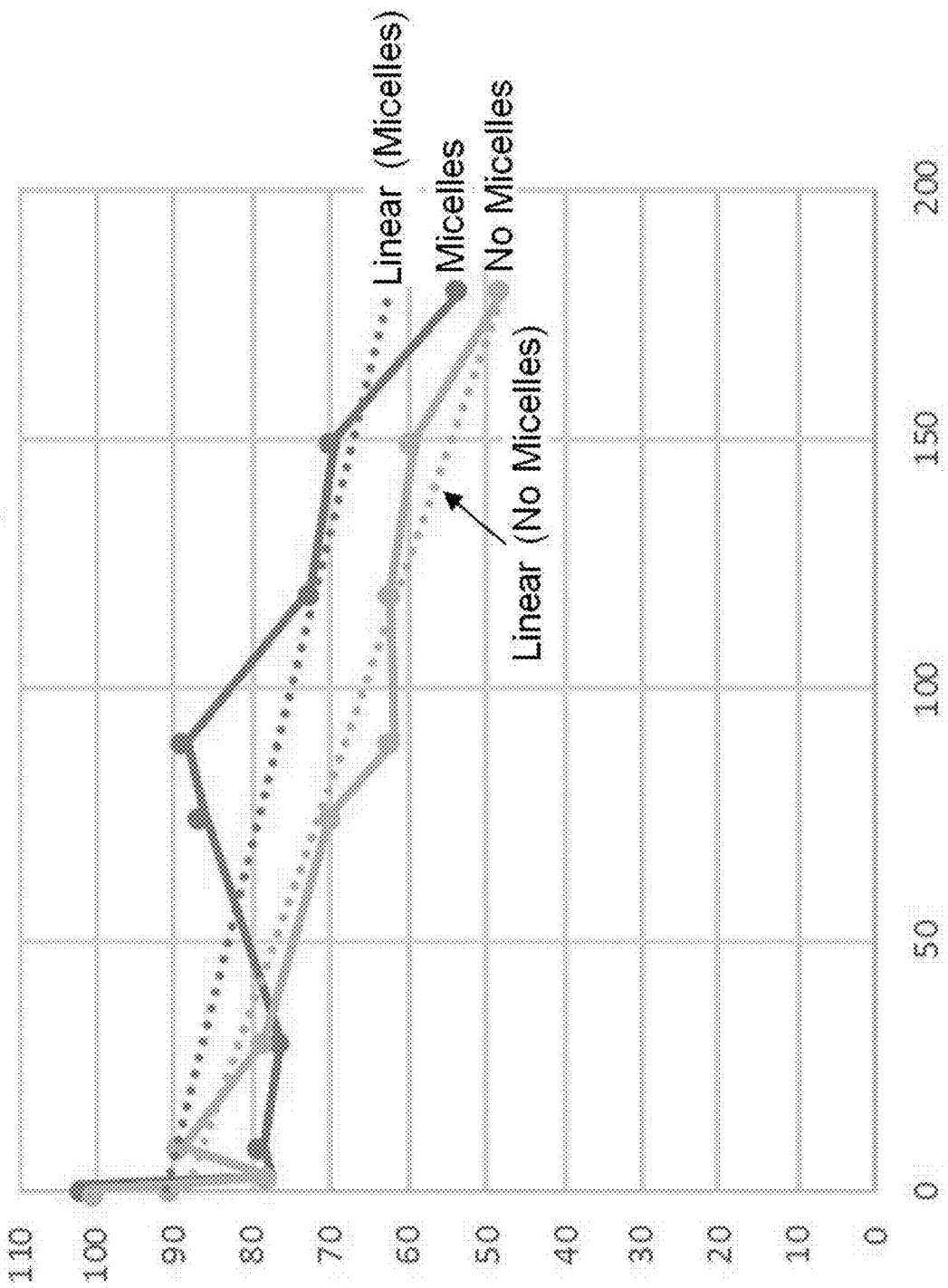
FIG. 5B shows the percentage of MMP-2200 remaining in artificial CSF over time (minutes) in the presence and absence of decyl glucoside. The normalized signal (percent) is plotted vs. time (minutes). The micelles show a slower rate of degradation when compared to the control in CSF.

In preferred embodiments, the present invention features the use of diffusion-ordered spectroscopy (DOSY) to observe the diffusion of surfactant molecules and aggregates to characterize surfactant properties such as the critical micelle concentration, particle radius, and aggregation number. As used herein, the term "glycoaggregate" refers to a collection or aggregation of glycosidic molecules, preferably forming micelles or vesicles, as shown in FIG. 2. Further, multicomponent micellular solutions, such as a micellular solution with a lipid or co-surfactant added or a solution with nonpolar solvents containing inverse micelles, may be characterized with DOSY.

According to some embodiments, the present invention features a method of optimizing formation of a glycoaggregate. The method may comprise forming a first glycoaggregate from at least two co-surfactants according to two or more reaction parameters, characterizing the first glycoaggregate using Diffusion Ordered Spectroscopy (DOSY) to determine a first diffusion coefficient, modifying at least one of the reaction parameters, forming a second glycoaggregate from at least two co-surfactants according to the modified reaction parameters, characterizing the second glycoaggregate using DOSY to determine a second diffusion coefficient, and comparing the first and second diffusion coefficients to determine if the first glycoaggregate or the second glycoaggregate is more suitable for a specific application, such as drug delivery. In some embodiments, the at least two co-surfactants may comprise a glycopeptide and a lipid. In one embodiment, the first glycoaggregate may be a micelle or vesicle. In another embodiment, the second glycoaggregate may be a micelle or vesicle. For comparison, both the first glycoaggregate and the second glycoaggregate should be micelles, or vesicles, but not one of each.

According to other embodiments, the present invention features a method of quality control for the formation of a glycoaggregate. The method may comprise forming the glycoaggregate from at least two co-surfactants, characterizing the glycoaggregate using Diffusion Ordered Spectroscopy (DOSY) to determine a diffusion coefficient, and comparing the diffusion coefficient to an optimal range of diffusion coefficients for a specific application to determine a quality of the glycoaggregate. In one embodiment, the glycoaggregate may be a micelle or vesicle.

In some embodiments, examples of the reaction parameters include a number of the co-surfactants, a selection of the co-surfactants, a ratio of the co-surfactants, a concentration of the co-surfactants, an order of addition of the co-surfactants, a reaction temperature, a mixing time, a presence of a catalyst, and a type of solvent system. By varying any one of these parameters, while fixing the others, the diffusion coefficients of the glycoaggregates can be compared to determine suitability in the specific application.

According to some other embodiments, the present invention features a method of quality control for the formation of a glycoaggregate. The method may comprise forming the glycoaggregate from at least two co-surfactants, characterizing the glycoaggregate using Diffusion Ordered Spectroscopy (DOSY) to determine a diffusion coefficient, and comparing the diffusion coefficient to an optimal range of diffusion coefficients for a specific application to determine a quality of the glycoaggregate. In one embodiment, the glycoaggregate may be a micelle or vesicle.

Consistent with the methods described herein, in some embodiments, the first co-surfactant may comprise a glycopeptide. The glycopeptide may be a drug or a pro-drug. As a non-limiting example, the glycopeptide may be a glycosylated opioid peptide or lactomorphin. Without wishing to limit the present invention, the glycopeptides may be used in the treatment of levodopa-induced dyskinesia. Additionally, the glycopeptides may be used in the treatment of acute kidney injury, addiction, aging, Alzheimer's disease, amyotrophic lateral sclerosis (ALS), arthritis, asthma, autoimmune disorders, cancer, cardiovascular disease, chronic kidney disease, chronic obstructive pulmonary disease (COPD), cystic fibrosis, dementia, depression, diabetes, endocrine disorders, fibromyalgia, headache, heart disease, hepatitis, hypertension, infectious diseases, inflammatory bowel disease, irritable bowel syndrome, liver disorders, lupus, metabolic disorders, multiple sclerosis, muscle disorders, neurological disorders, nerve disorders, obesity, ophthalmologic conditions, orthopedic disorders, pain, pancreatic disorders, Parkinson's disease, psychiatric disorders, respiratory disorders, stroke, traumatic brain injury, other central nervous system disorders, other diseases and disorders, and the like.

According to one embodiment, a specific application of the glycoaggregate may be drug delivery. Without wishing to limit the invention to any particular theory or mechanism, it can be advantageous for glycopeptide delivery for the glycopeptide to function as a co-surfactant in the formation of a micelle or vesicle. In selected embodiments, the delivery system or delivery vehicle may deliver the glycopeptide to a therapeutic site.

In another embodiment, the delivery system or delivery vehicle may comprise a microemulsion or a nanoparticle. In some embodiments, the vesicle may be a unilamellar vesicle or a multilamellar vesicle. In other embodiments, the micelle or vesicle may have a diameter of about 5-7 nm. In further embodiments, a diffusion coefficient of the micelle or vesicle may be determined using Diffusion Ordered Spectroscopy (DOSY).

In some embodiments, the glycopeptide can be synthesized by providing a peptide, providing a saccharide, and covalently linking the peptide with the saccharide, thereby forming said glycopeptide. In a non-limiting example, the peptide includes a serine residue, which is linked to the saccharide. An example of the saccharide is a glucose. The peptide itself may be a drug or a pro-drug. It is believed that this strategy may be used to modify pharmaceutically relevant peptides to form the glycopeptides, which may be advantageously delivered by a micelle or vesicle.

In other embodiments, the second co-surfactant may comprise a glycolipid. In one embodiment, the glycolipid may be a saccharide linked to a chain component. For example, the glycolipid may be according to the following structures: i) the saccharide portion may be according to the following formula:

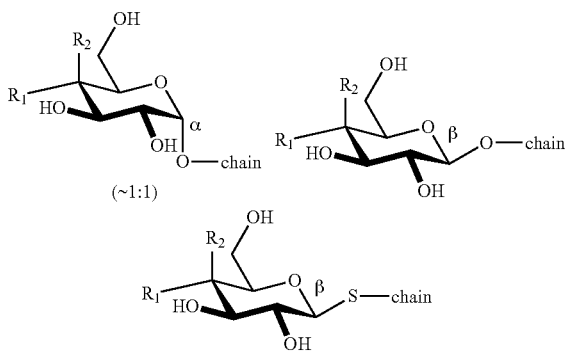

i) $R_1$ = H, O—H, O-β-D-Glucose, O-β-D-Galactose, or O-α-D-Glucose
$R_2$ = H or OH In some embodiments, the chain may be according to any one of the following formulas:

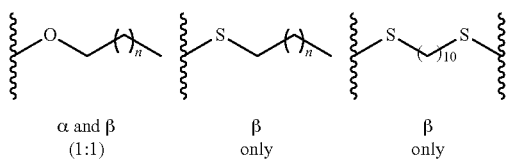

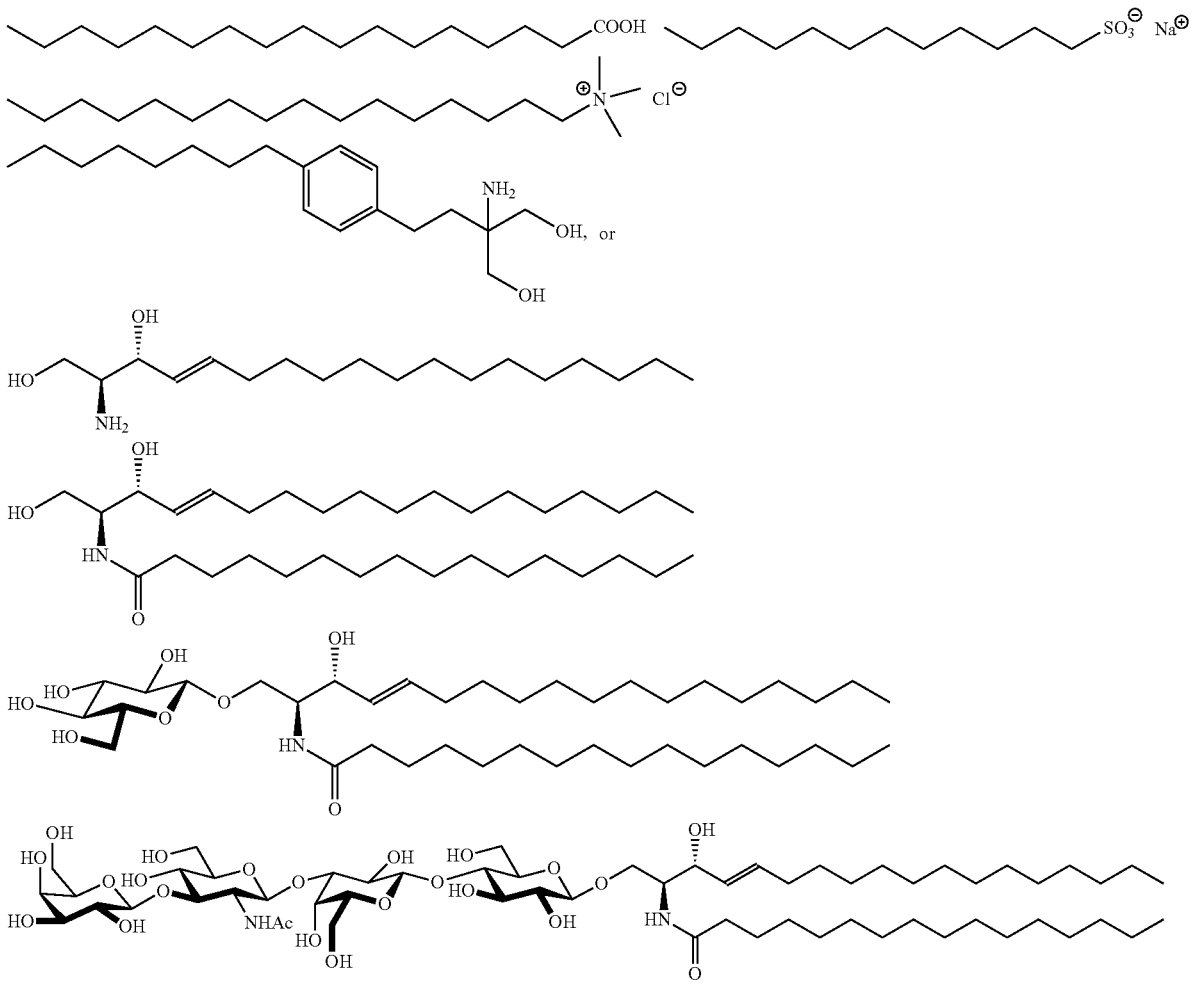

where n is 6, 8, or 10.

As shown above, the glycolipids may comprise glucosides and thioglucosides which form micelles in aqueous solution. The aglycones may comprise long-chained fatty alcohols or thiols. The alpha,omega-thiols contain additional thiols that can be glycosylated a second time at the omega SH to produce boloform amphiphiles, adsorbed to metal surfaces, or extended via a disulfide linkage (~S—S~).

In some other embodiments, the second co-surfactant may comprise another lipid, which may or may not be pharmacologically active. In some embodiments, the additional lipids may be simple lipids that increase the robustness of the micelles, or may be used to impart a positive or negative charge to the micelles. The lipids may also have specific cellular recognition elements such as those found on glycospingolipids and gangliosides. As a non-limiting example, the second co-surfactant may be according to any one of the following structures:

According to other embodiments, the present invention features a glycopeptide delivery system comprising a glycolipid aggregate. Referring to FIG. 1A, in one embodiment, the glycolipid aggregate may comprise a first co-surfactant comprising a glycopeptide, and a second co-surfactant comprising a lipid. The glycopeptides may be according to those described herein. Consistent with previous embodiments, the lipids may be glycolipids or additional lipids such as those described herein. Without wishing to be bound to a particular mechanism, the first co-surfactant and the second co-surfactant can aggregate to form said glycoaggregate. The glycoaggregate may be a micelle or vesicle. In some embodiments, the vesicle may be a unilamellar vesicle or a multilamellar vesicle. Preferably, the glycoaggregate has a diffusion coefficient that is determined using Diffusion Ordered Spectroscopy (DOSY).

Figure 1B:
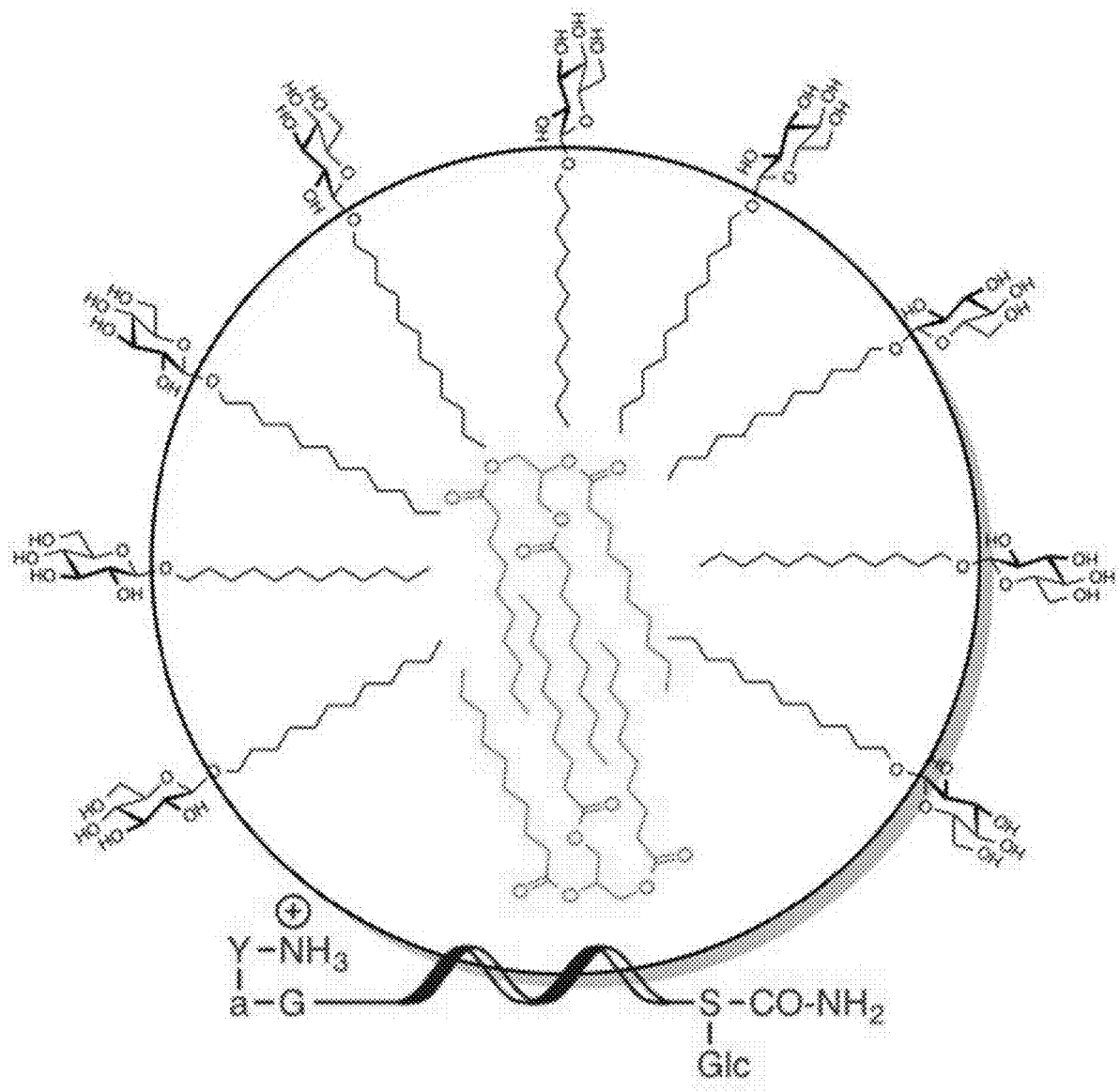
FIG. 1B shows a schematic of a triglyceride encapsulating micelle formed from glycolipids and glycopeptides

Referring to FIG. 1B, in other embodiments, the glycoaggregate may further comprise lipid molecules, such as triglycerides. In a non-limiting embodiment, the co-surfactants can aggregate to form a lipid shell that encapsulates the lipid molecules.

In some embodiments, the glycoaggregate can have a diameter ranging from about 5 to about 50 nm. For example, the glycoaggregate diameter may be about 5-7 nm. In other embodiments, the glycoaggregate can have a diameter larger than 50 nm. For instance, if glycoaggregate includes encapsulated lipid molecules, the glycoaggregate diameter may be about 100-500 nm.

In some embodiments, the delivery system may be in the form of nanoparticles or microemulsion. Without wishing to limit the present invention to a particular theory or mechanism, the delivery system is configured to deliver the glycopeptide to a therapeutic site.

In some embodiments, the present invention features a catalytic, multi-gram scale synthesis of alkyl glycosides with minimally-competent Lewis acids which may allow for the production of a library of fundamental glycolipids for structure and function studies.

TABLE 2

Surface tension and DOSY diffusion coefficients for various glycolipids.
CMC (mM)

| Compound | Surface Tens. | DOSY (Diffusion Coefficients) |
|---|---|---|
| MelOC8 | 44 ± 5 | 40 ± 5 |
| MelOC10 | 3.3 ± 0.2 | 3.9 ± 0.1 |
| MelOC12 | 0.30 ± 0.02 | 0.31 ± 0.005 |
| CelOC8 | 19 ± 3 | 21 ± 2 |
| CelOC10 | 1.8 ± 0.2 | 2.2 ± 0.7 |
| CelOC12 | 0.18 ± 0.01 | 0.29 ± 0.4 |
| GlcOC8 | 20 (lit) | 20 ± 3 |
| GlcOC10 | 2.2 (lit) | 2.1 ± 0.7 |
| SDS | 8.2 (lit) | 8.4 ± 2 |

The present invention features a method of optimizing formation of a glycoaggregate, the method comprising: forming the glycoaggregate from at least two co-surfactants, wherein the first co-surfactant comprises a glycopeptide and the second co-surfactant comprises at least one amphipathic molecule; characterizing the glycoaggregate using spectroscopy to determine a diffusion coefficient; and comparing the diffusion coefficient to an optimal range of diffusion coefficients for a specific application to determine a quality of the glycoaggregate.

In some embodiments, the glycoaggregate is a micelle or vesicle. In some embodiments the glycopeptide is a drug or a pro-drug. In some embodiments, the specific application is drug delivery. In some embodiments, the glycopeptide is a glycosylated opioid peptide or lactomorphin. In some embodiments, at least one amphipathic molecule is a glycosylated endomorphin, dermorphin, or angiotensin, a glycosylated VEGF peptide fragment, or a glycosylated oxytocin, VIP or PACAP agonist. In some embodiments, at least one amphipathic molecule is a lipid.

In some embodiments, the lipid is a glycolipid according to any one of the following structures:

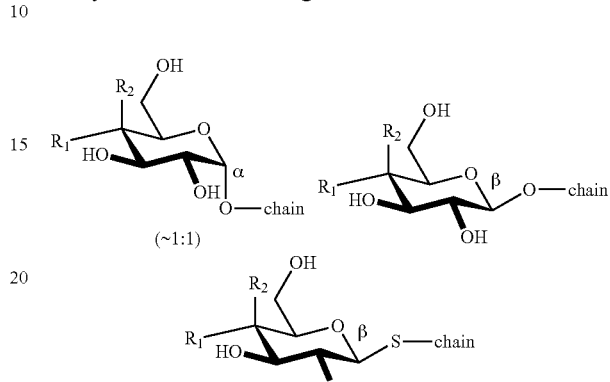

wherein $R_1$ is H, OH, O-β-D-Glucose, O-β-D-Galactose, or O-α-D-Glucose; wherein $R_2$ is H or OH;

wherein the chain is according to any one of the following formulas:

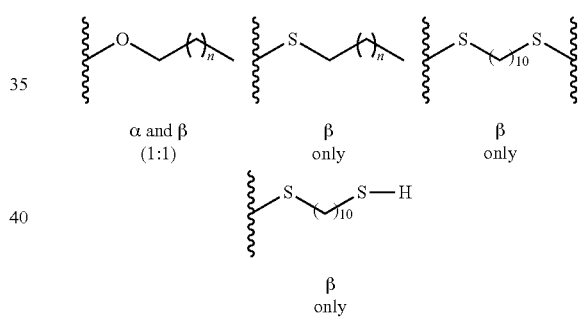

wherein n is 6, 8, or 10.

In some embodiments, the lipid is according to any one of the following structures:

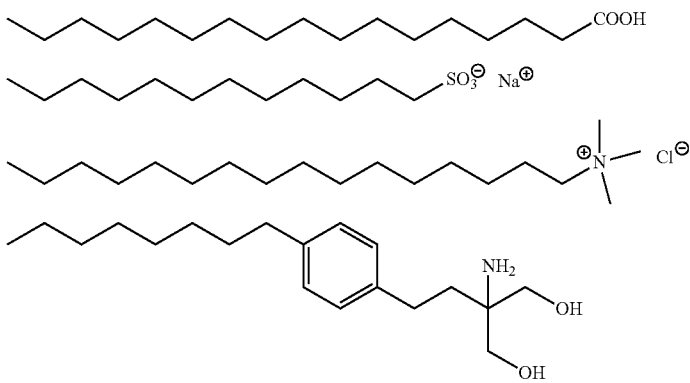

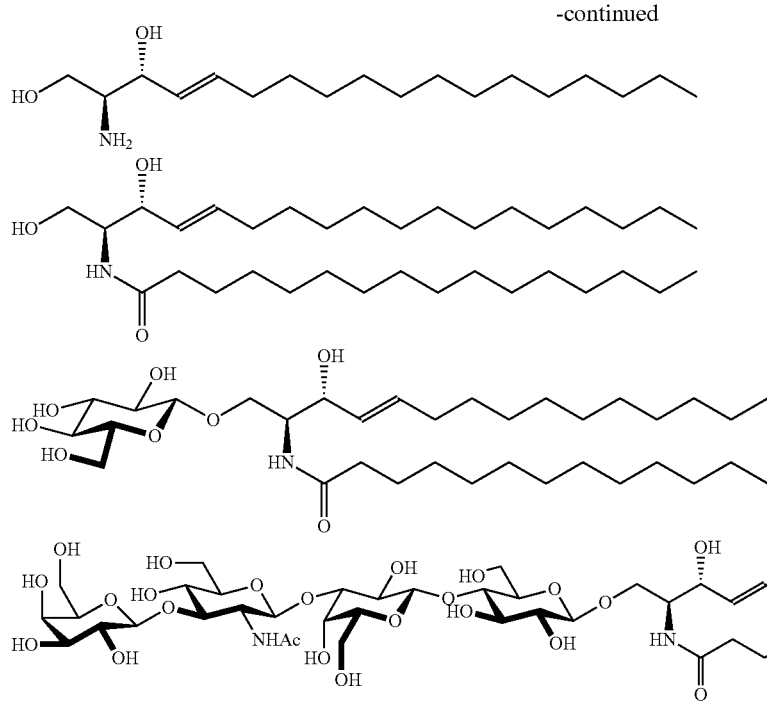
In some embodiments, the lipid is according to any one of the following structures:
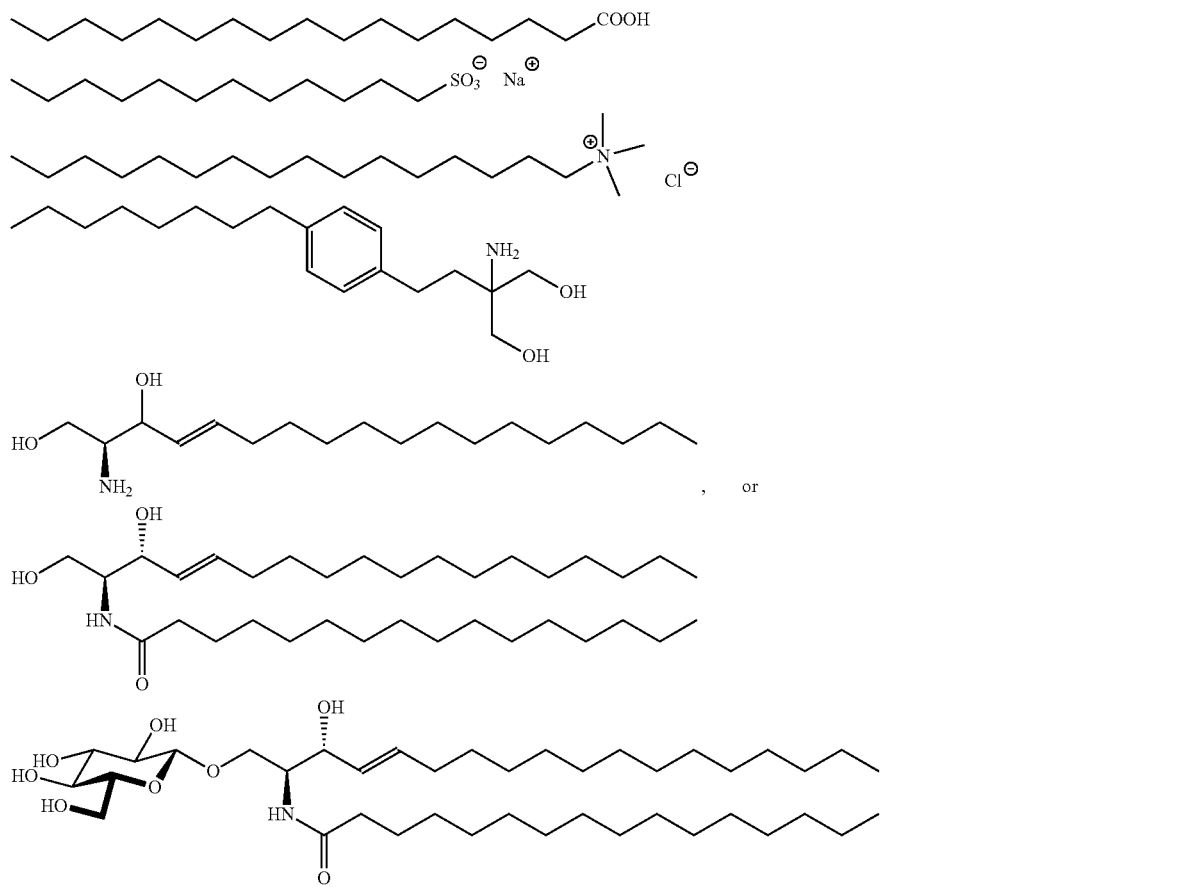

-continued

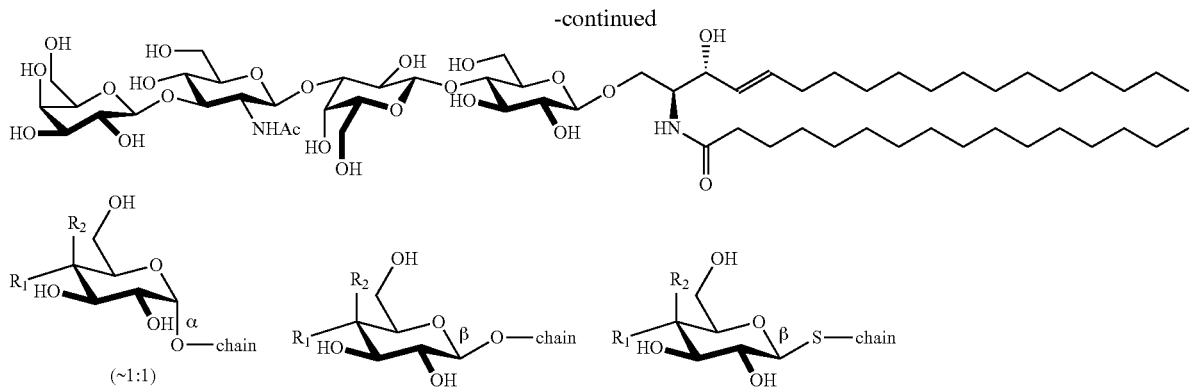

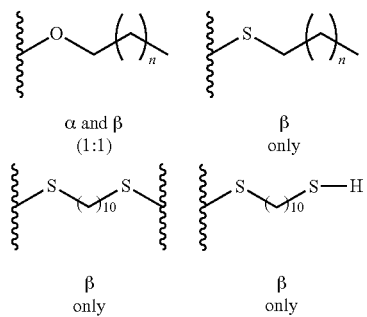

wherein R₁ is H, OH, O-β-D-Glucose, O-β-D-Galactose, or O-α-D-Glucose; wherein R₂ is H or OH;
wherein the chain is according to any one of the following formulas:

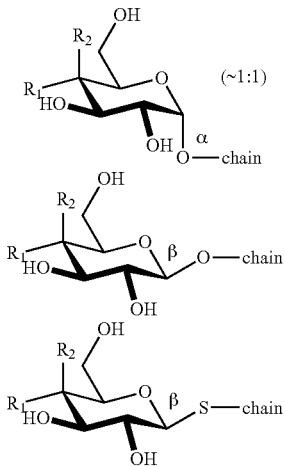

wherein n is 6, 8, or 10.

In some embodiments, the form of spectroscopy used is Diffusion Ordered Spectroscopy (DOSY). In some embodiments, the form of spectroscopy used is Dynamic Light Scattering (DLS).

In some embodiments, the method of the present invention further comprises: forming the glycoaggregate according to two or more reaction parameters; modifying at least one of the reaction parameters; forming a second gylcoaggregate from at least two co-surfactants according to the modified reaction parameters, wherein the at least two co-surfactants comprise a glycopeptide and at least one amphipathic molecule; characterizing the second glycoaggregate using spectroscopy to determine a second diffusion coefficient; and comparing the diffusion coefficient to the second diffusion coefficient to determine if the glycoaggregate or the second glycoaggregate is more suitable for a specific application.

The present invention features a glycopeptide delivery system, comprising a glycoaggregate comprising: a first co-surfactant comprising a glycopeptide; and a second co-surfactant comprising at least one amphipathic molecule; wherein the first co-surfactant and the second co-surfactant aggregate to form said glycoaggregate, wherein the glycoaggregate has a diffusion coefficient determined using spectroscopy.

In some embodiments, the glycoaggregate is a micelle or vesicle. In some embodiments, the vesicle is a unilamellar vesicle or a multilamellar vesicle.

In some embodiments, the glycopeptide is a drug or a pro-drug. In some embodiments, the glycopeptide is a glycosylated opioid peptide or lactomorphin. In some embodiments, at least one amphipathic molecule is a glycosylated endomorphin, dermorphin, or angiotensin, a glycosylated VEGF peptide fragment, or a glycosylated oxytocin, VIP or PACAP agonist. In some embodiments, at least one amphipathic molecule is a lipid.

In some embodiments, the lipid is a glycolipid according to any one of the following structures:

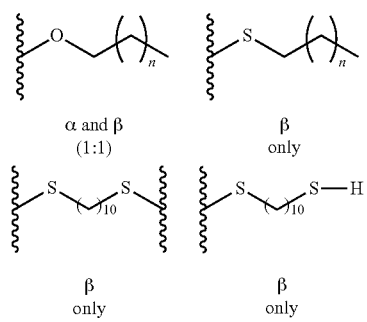

wherein R₁ is H, OH, O-β-D-Glucose, O-β-D-Galactose, or O-α-D-Glucose; wherein R₂ is H or OH;
wherein the chain is according to any one of the following formulas:

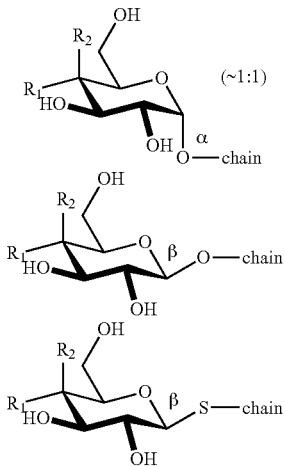

wherein n is 6, 8, or 10.

In some embodiments, the lipid is according to any one of the following structures:

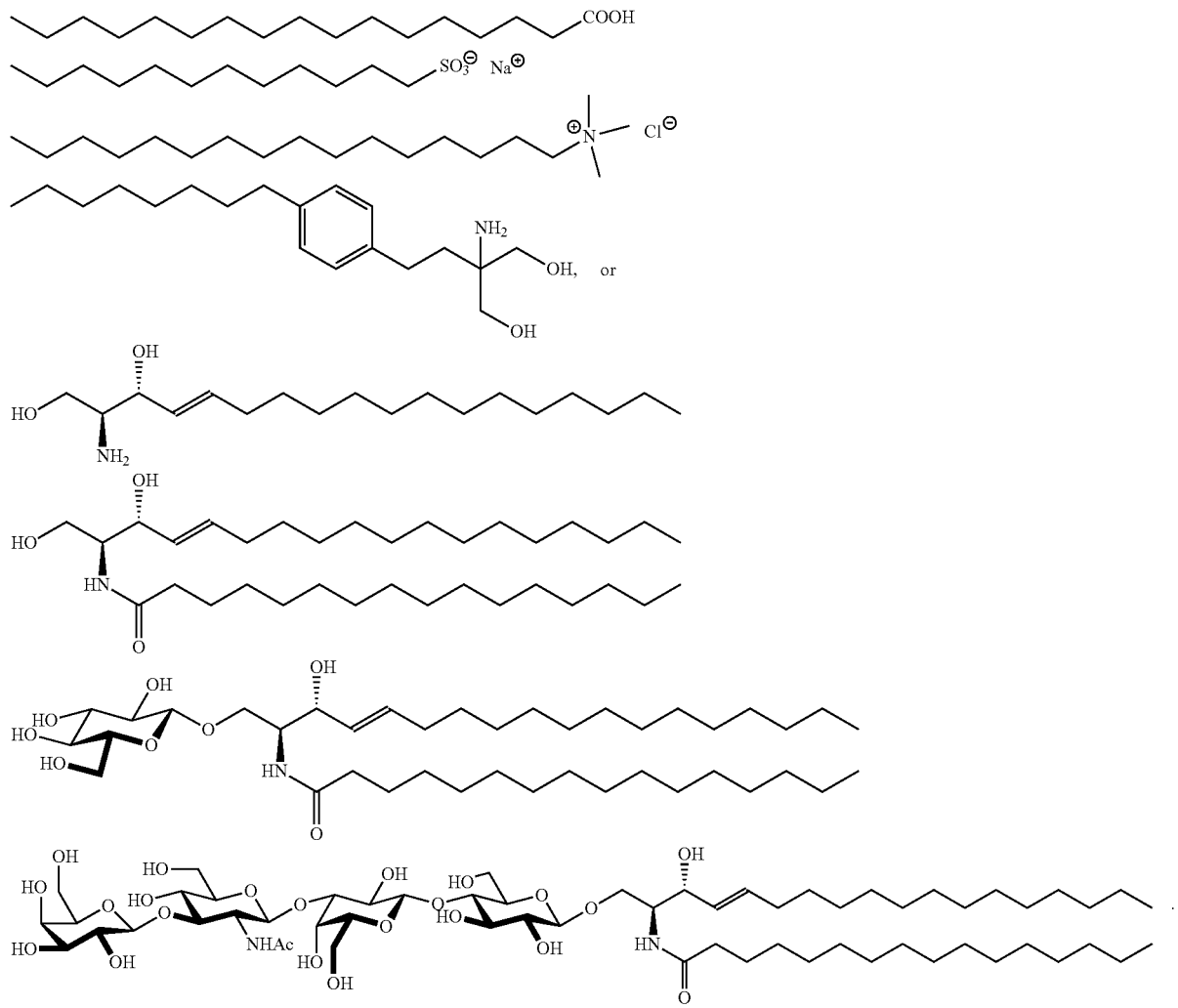

In some embodiments, the delivery system is in a form of a nanoparticle or microemulsion. In some embodiments, the glycoaggregate has a diameter of about 5-10 nm. In some embodiments, the delivery system is configured to deliver the glycopeptide to a therapeutic site. In some embodiments, the glycoaggregate further comprises triglycerides. In some embodiments, the co-surfactants encapsulate the triglycerides. In some embodiments, the form of spectroscopy used is Diffusion Ordered Spectroscopy (DOSY). In some embodiments, the form of spectroscopy used is Dynamic Light Scattering (DLS).

The present invention features a supramolecular assembly, said supramolecular assembly comprising: at least one glycopeptide; at least one amphipathic molecule; and wherein said supramolecular assembly is capable of delivering the at least one glycopeptide to a cell without the supramolecular assembly fusing into the cell.

In some embodiments, the supramolecular assembly is a micelle or vesicle.

In some embodiments, the vesicle is a unilamellar vesicle or a multilamellar vesicle.

In some embodiments, the glycopeptide is a drug or a pro-drug. In some embodiments, the glycopeptide is a glycosylated opioid peptide or lactomorphin. In some embodiments, at least one amphipathic molecule is a glycosylated endomorphin, dermorphin, or angiotensin, a glycosylated VEGF peptide fragment, or a glycosylated oxytocin, VIP or PACAP agonist. In some embodiments, the at least one amphipathic molecule is a lipid.

In some embodiments, the lipid is a glycolipid according to any one of the following structures:

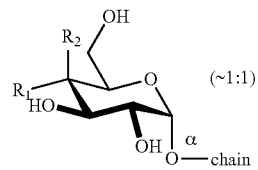

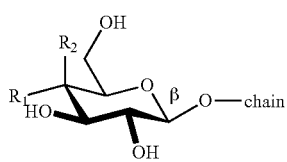

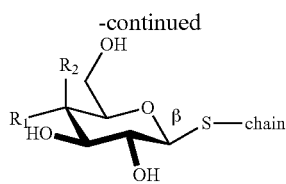
wherein R$_1$ is H, OH, O-β-D-Glucose, O-β-D-Galactose, or O-α-D-Glucose; wherein R$_2$ is H or OH;
wherein the chain is according to any one of the following formulas:
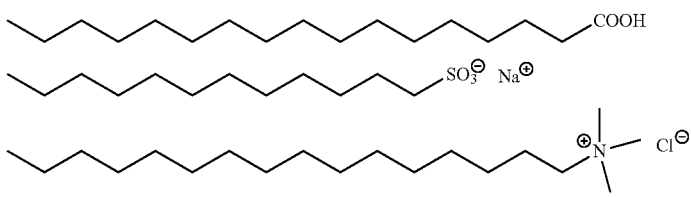
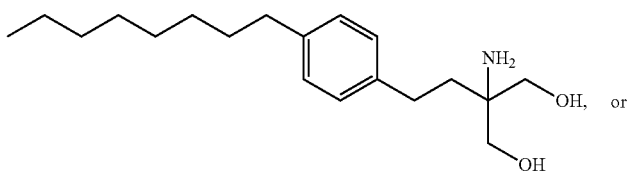
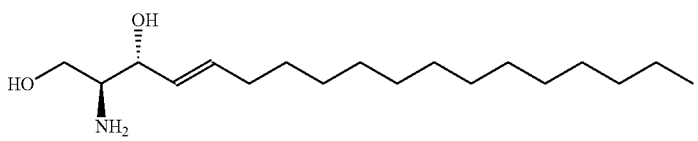
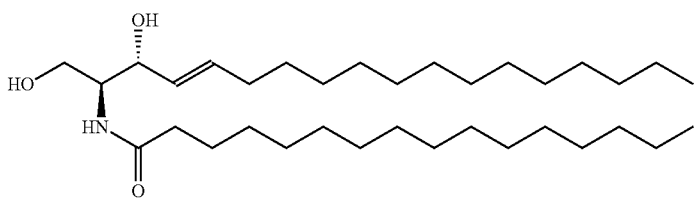
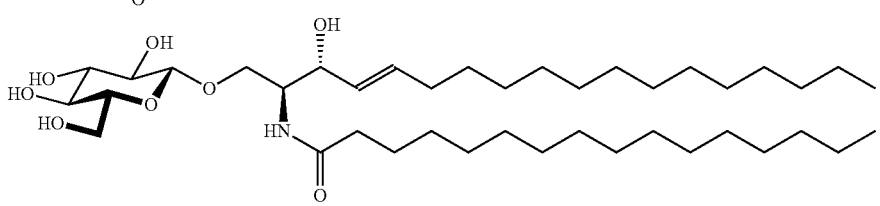
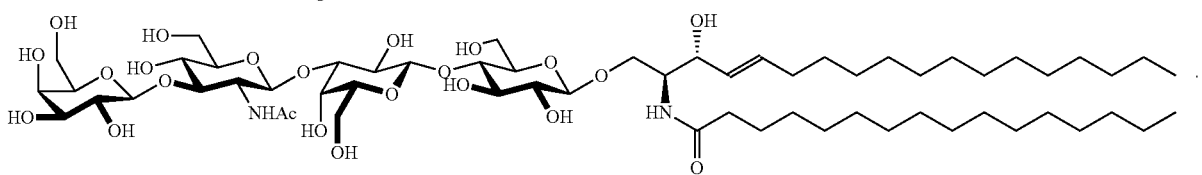
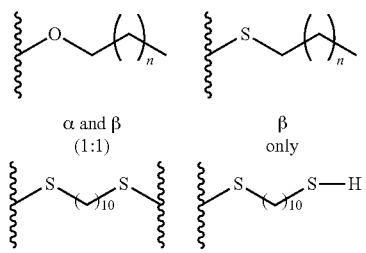
wherein n is 6, 8, or 10.
In some embodiments, the lipid is according to any one of the following structures:

In some embodiments, the supramolecular assembly is in a form of a nanoparticle or microemulsion.

In some embodiments, the supramolecular assembly has a diameter of about 5-10 nm. In some embodiments, the supramolecular assembly is configured to deliver the glycopeptide to a therapeutic site. In some embodiments, the supramolecular assembly further comprises triglycerides. In some embodiments, the at least one amphipathic molecule encapsulates the triglycerides. In some embodiments, spectroscopy is used to determine the supramolecular assembly's diffusion coefficient. In some embodiments, the form of spectroscopy used is Diffusion Ordered Spectroscopy (DOSY). In some embodiments, the form of spectroscopy used is Dynamic Light Scattering (DLS).

In some embodiments, the supramolecular assembly is dispersed in a liquid. In some embodiments, the supramolecular assembly is a precipitated solid lipid nanoparticle (SLN). In some embodiments, the supramolecular assembly is dispersed in a gas.

In some embodiments, the supramolecular assembly delivers the at least one glycopeptide to a membrane via a physical interaction between the supramolecular assembly and the membrane. In some embodiments, the supramolecular assembly delivers the at least one glycopeptide to a membrane via repeated intermittent physical interactions between the supramolecular assembly and the membrane. In some embodiments, the membrane is a plasma membrane of a cell. In some embodiments, the membrane is an intracellular barrier. In some embodiments, the intracellular barrier is a membrane is an intracellular organelle. In some embodiments, the intracellular barrier defines the boundaries or intracellular compartments. In some embodiments, the intracellular barrier is a boundary between one part of a cell and another part of a cell. In some embodiments, the intracellular barrier is a nuclear membrane. In some embodiments, the membrane is a tissue membrane. In some embodiments, the membrane is a synthetic membrane. In some embodiments, the membrane is a biological membrane. In some embodiments, the membrane is a non-biological membrane. In some embodiments, the membrane is a selective barrier. In some embodiments, the membrane is a selectively permeable membrane. In some embodiments, the membrane is formed by at least one of the following: lipids, phospholipids, proteins, embedded proteins, integral proteins, or peripheral proteins, carbohydrates, sugars, or oligosaccharides.

In some embodiments, the at least one glycopeptide is a therapeutic glycopeptide. In some embodiments, the supramolecular assembly further comprises at least one therapeutic molecule. In some embodiments, the supramolecular assembly delivers the at least one therapeutic molecule to a membrane via a physical interaction between the supramolecular assembly and the membrane. In some embodiments, the supramolecular assembly delivers the at least one therapeutic molecule to the membrane via repeated intermittent physical interactions between the supramolecular assembly and the membrane.

The present invention features a method of optimizing formation of a glycoaggregate, the method comprising: forming a first glycoaggregate from at least two co-surfactants according to two or more reaction parameters, wherein the at least two co-surfactants comprise a glycopeptide and at least one amphipathic molecule; characterizing the first glycoaggregate using spectroscopy to determine a first diffusion coefficient; modifying at least one of the reaction parameters; forming a second glycoaggregate from at least two co-surfactants according to the modified reaction parameters, wherein the at least two co-surfactants comprise a glycopeptide and at least one amphipathic molecule; characterizing the second glycoaggregate using spectroscopy to determine a second diffusion coefficient; and comparing the first and second diffusion coefficients to determine if the first glycoaggregate or the second glycoaggregate is more suitable for a specific application.

In some embodiments, the first glycoaggregate is a micelle or vesicle. In some embodiments, the second glycoaggregate is a micelle or vesicle.

In some embodiments, the reaction parameters are selected from the group comprising a number of the co-surfactants, a selection of the co-surfactants, a ratio of the co-surfactants, a concentration of the co-surfactants, an order of addition of the co-surfactants, a reaction temperature, a mixing time, a presence of a catalyst, and a type of solvent system.

In some embodiments, the glycopeptide is a drug or a pro-drug. In some embodiments, the glycopeptide is synthesized by providing a peptide, providing a saccharide, and covalently linking the peptide with the saccharide, thereby forming said glycopeptide. In some embodiments, the peptide includes a serine residue, wherein the saccharide is linked to the serine residue. In some embodiments, the saccharide is a glucose. In some embodiments, the peptide is a drug or a pro-drug. In some embodiments, the glycopeptide is a glycosylated opioid peptide. In some embodiments, the glycopeptide is lactomorphin. In some embodiments, the specific application is drug delivery. In some embodiments, at least one amphipathic molecule is a glycosylated endomorphin, dermorphin, or angiotensin, a glycosylated VEGF peptide fragment, or a glycosylated oxytocin, VIP or PACAP agonist. In some embodiments, at least one amphipathic molecule is a lipid.

In some embodiments, the lipid is a glycolipid according to any one of the following structures:

wherein $R_1$ is H, OH, O-β-D-Glucose, O-β-D-Galactose, or O-α-D-Glucose; wherein $R_2$ is H or OH;

wherein the chain is according to any one of the following formulas:

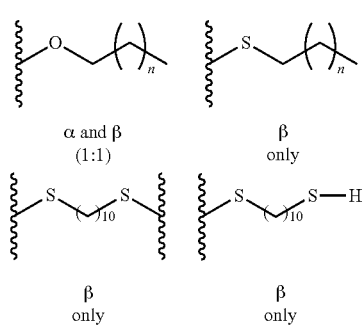

wherein n is 6, 8, or 10.

In some embodiments, the lipid is according to any one of the following structures:

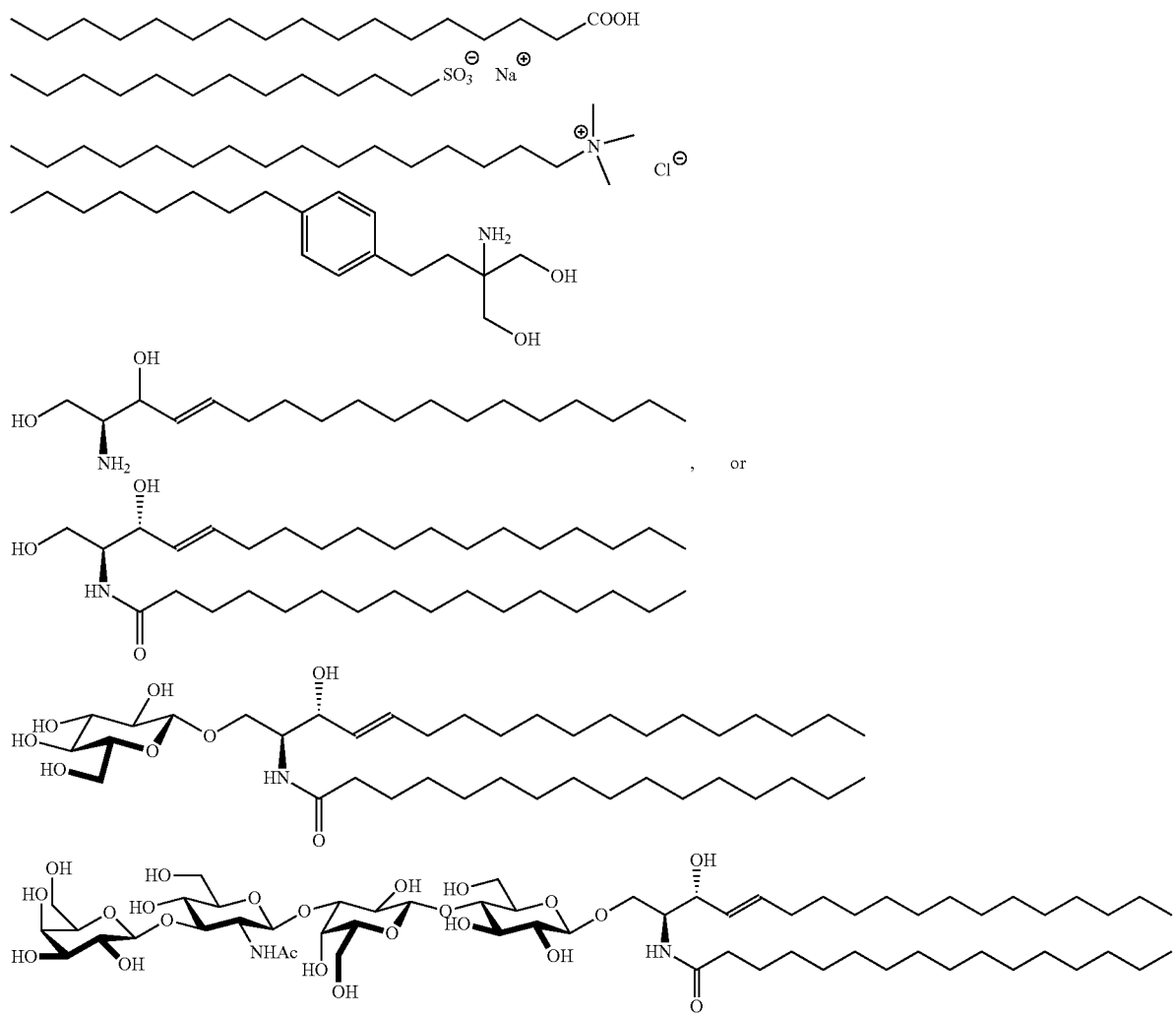

In some embodiments, the form of spectroscopy used is Diffusion Ordered Spectroscopy (DOSY). In some embodiments, the form of spectroscopy used is Dynamic Light Scattering (DLS).

The following embodiments are intended to be illustrative only and not to be limiting in any way.

Embodiment 1: A method of optimizing formation of a glycoaggregate, the method comprising: forming the glycoaggregate from at least two co-surfactants, wherein the first co-surfactant comprises a glycopeptide and the second co-surfactant comprises at least one amphipathic molecule; characterizing the glycoaggregate using spectroscopy to determine a diffusion coefficient; and comparing the diffusion coefficient to an optimal range of diffusion coefficients for a specific application to determine a quality of the glycoaggregate.

Embodiment 2: The method of embodiment 1, wherein the glycoaggregate is a micelle or vesicle.

Embodiment 3: The method of embodiment 1, wherein the glycopeptide is a drug or a pro-drug.

Embodiment 4: The method of embodiment 1, wherein the specific application is drug delivery.

Embodiment 5: The method of embodiment 1, wherein the glycopeptide is a glycosylated opioid peptide or lactomorphin or another glycopeptide with desirable biological properties.

Embodiment 6: The method of embodiment 1, wherein the at least one amphipathic molecule is a glycosylated endomorphin, dermorphin, or angiotensin, a glycosylated VEGF peptide fragment, or a glycosylated oxytocin, VIP or PACAP agonist, or another glycopeptide with desirable biological properties.

Embodiment 7: The method of embodiment 1, wherein the at least one amphipathic molecule is a lipid.

Embodiment 8: The method of embodiment 7, wherein the lipid is a glycolipid according to any one of the following structures:

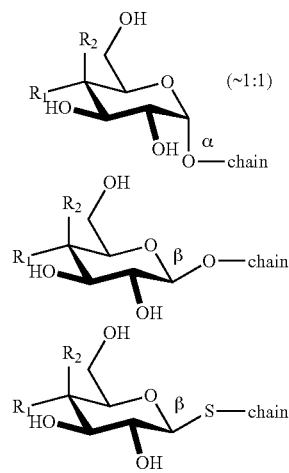

wherein $R_1$ is H, OH, O-β-D-Glucose, O-β-D-Galactose, or O-α-D-Glucose; wherein $R_2$ is H or OH;

wherein the chain is according to any one of the following formulas:

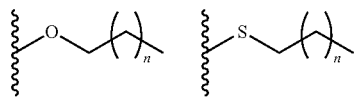

α and β      β
(1:1)      only

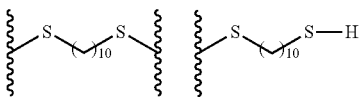

β      β
only      only wherein n is 6, 8, or 10.

Embodiment 9: The method of embodiment 7, wherein the lipid is according to any one of the following structures:

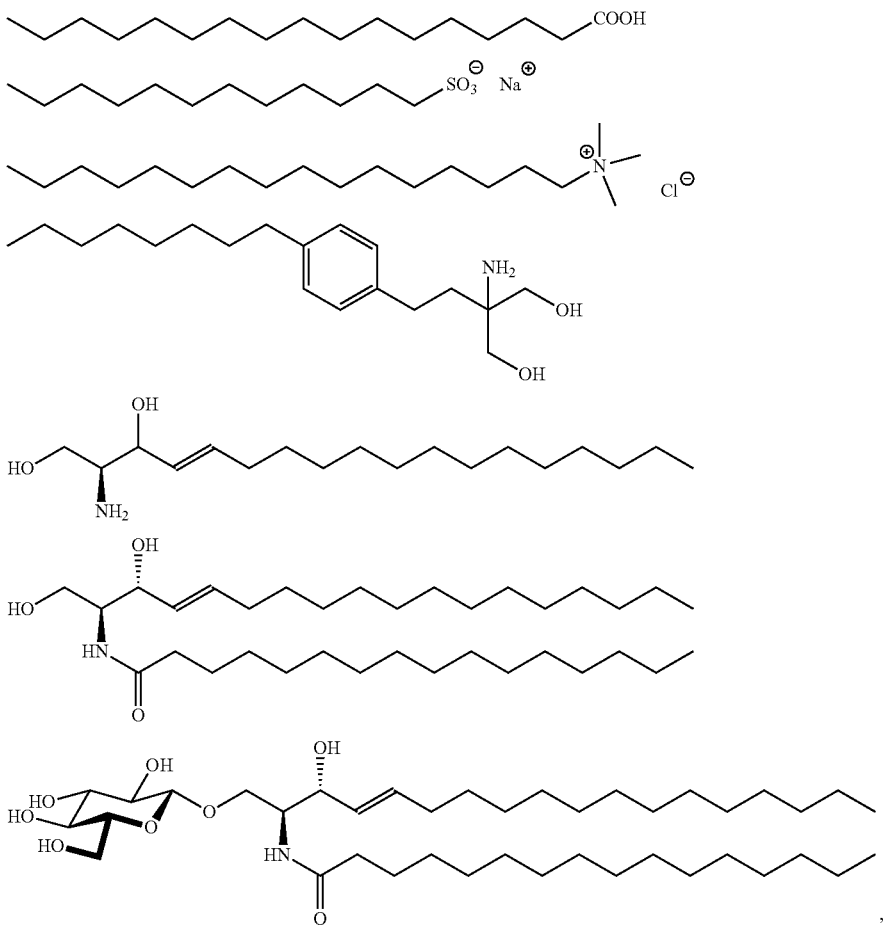

, or

-continued
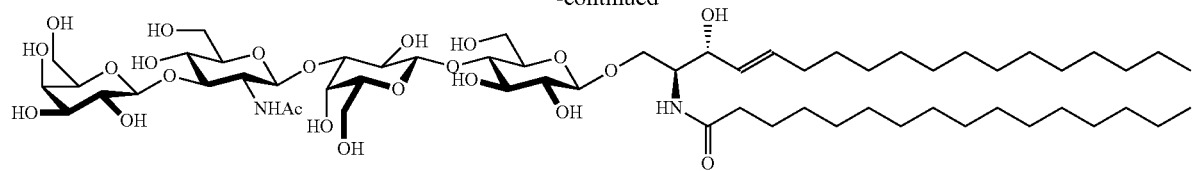
Embodiment 10: The method of embodiment 7, wherein the lipid is according to any one of the following structures:
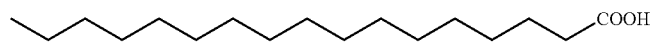
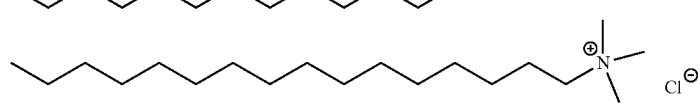
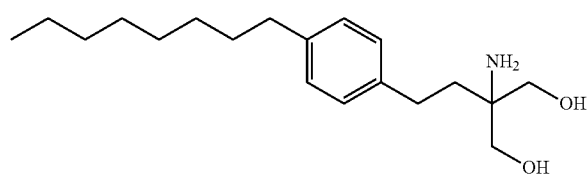
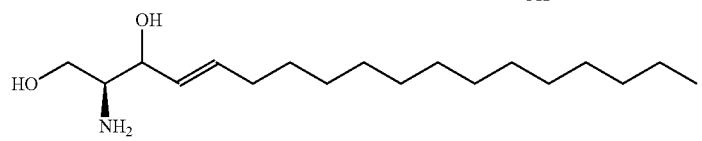, or
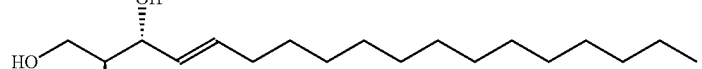
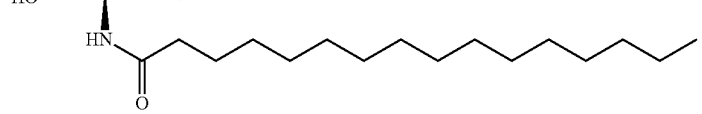
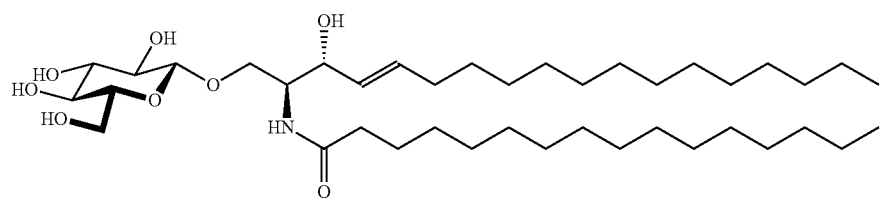
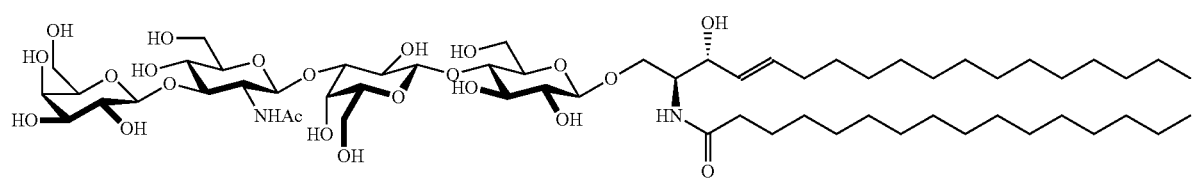
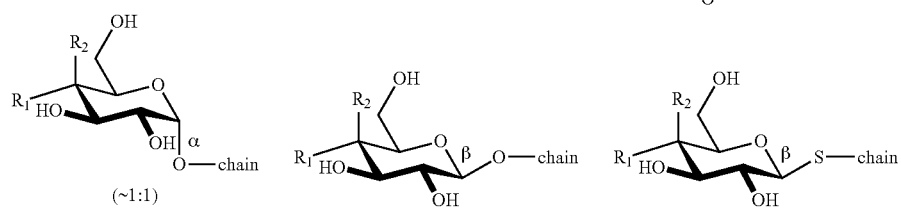

wherein $R_1$ is H, OH, O-β-D-Glucose, O-β-D-Galactose, or O-α-D-Glucose; wherein $R_2$ is H or OH;

wherein the chain is according to any one of the following formulas:

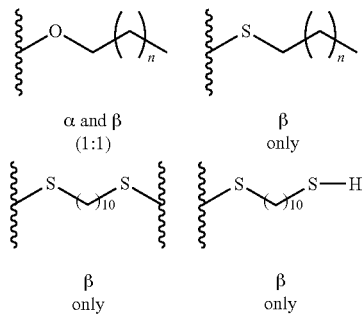

wherein n is 6, 8, or 10.

Embodiment 11: The method of embodiment 1, wherein the form of spectroscopy used is Diffusion Ordered Spectroscopy (DOSY).

Embodiment 12: The method of embodiment 1, wherein the form of spectroscopy used is Dynamic Light Scattering (DLS).

Embodiment 13: The method of embodiment 1, the method further comprising:
forming the glycoaggregate according to two or more reaction parameters;
modifying at least one of the reaction parameters;
forming a second gylcoaggregate from at least two co-surfactants according to the modified reaction parameters, wherein the at least two co-surfactants comprise a glycopeptide and at least one amphipathic molecule;
characterizing the second glycoaggregate using spectroscopy to determine a second diffusion coefficient; and
comparing the diffusion coefficient to the second diffusion coefficient to determine if the glycoaggregate or the second glycoaggregate is more suitable for a specific application.

Embodiment 14: A glycopeptide delivery system, comprising a glycoaggregate comprising: a first co-surfactant comprising a glycopeptide; and a second co-surfactant comprising at least one amphipathic molecule; wherein the first co-surfactant and the second co-surfactant aggregate to form said glycoaggregate, wherein the glycoaggregate has a diffusion coefficient determined using spectroscopy.

Embodiment 15: The delivery system of embodiment 14, wherein the glycoaggregate is a micelle or vesicle.

Embodiment 16: The delivery system of embodiment 15, wherein the vesicle is a unilamellar vesicle or a multilamellar vesicle.

Embodiment 17: The delivery system of embodiment 14, wherein the glycopeptide is a drug or a pro-drug.

Embodiment 18: The delivery system of embodiment 14, wherein the glycopeptide is a glycosylated opioid peptide or lactomorphin.

Embodiment 19: The method of embodiment 14, wherein at least one amphipathic molecule is a glycosylated endomorphin, dermorphin, or angiotensin, a glycosylated VEGF peptide fragment, or a glycosylated oxytocin, VIP or PACAP agonist, or another glycopeptide with desirable biological properties.

Embodiment 20: The delivery system of embodiment 14, wherein the at least one amphipathic molecule is a lipid.

Embodiment 21: The delivery system of embodiment 20, wherein the lipid is a glycolipid according to any one of the following structures:

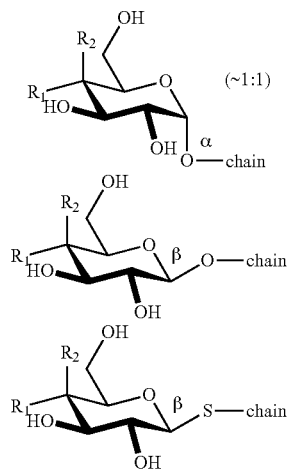

wherein $R_1$ is H, OH, O-β-D-Glucose, O-β-D-Galactose, or O-α-D-Glucose; wherein $R_2$ is H or OH;

wherein the chain is according to any one of the following formulas:

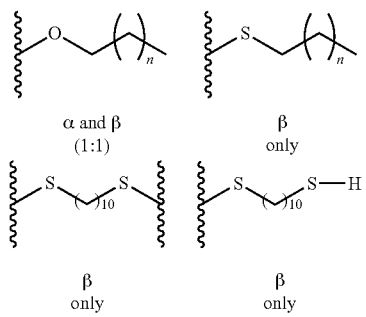

wherein n is 6, 8, or 10.

Embodiment 22: The delivery system of embodiment 20, wherein the lipid is according to any one of the following structures:

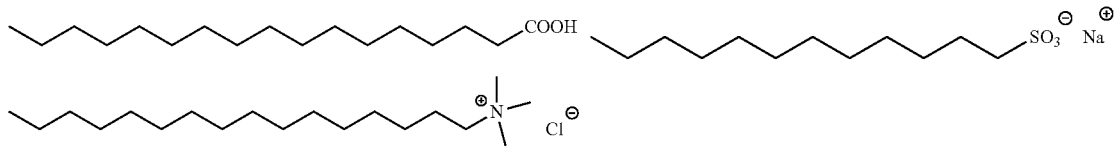

-continued

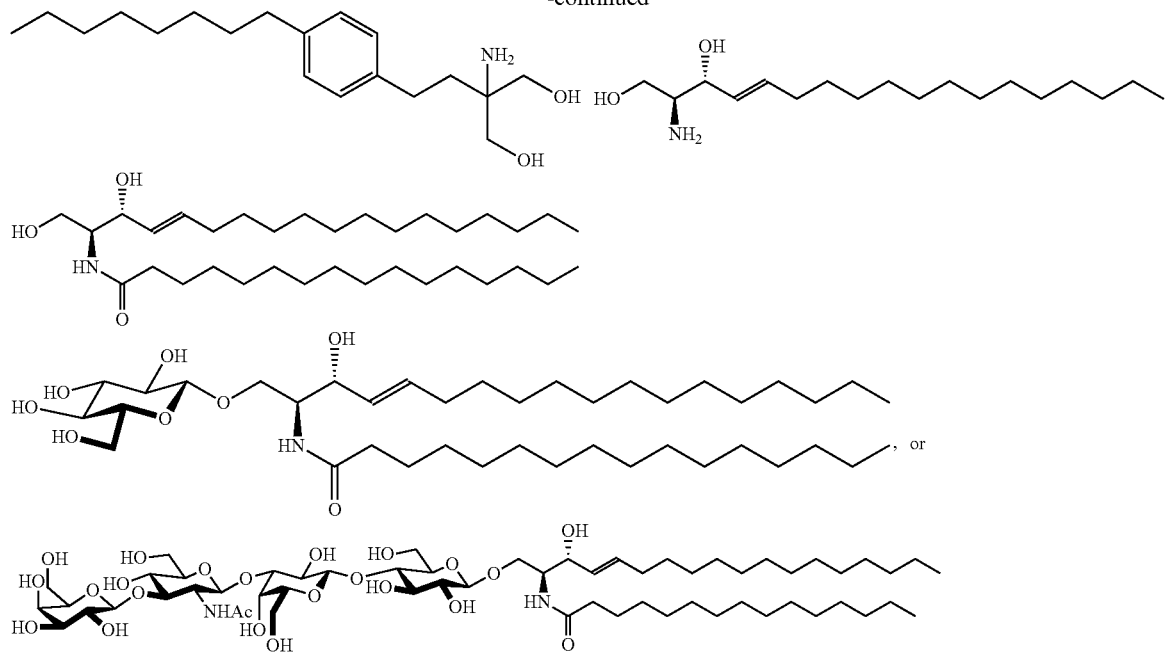

Embodiment 23: The delivery system of embodiment 14, wherein the delivery system is in a form of a nanoparticle or microemulsion.

Embodiment 24: The delivery system of embodiment 14, wherein the glycoaggregate has a diameter of about 5-10 nm.

Embodiment 25: The delivery system of embodiment 14, wherein the delivery system is configured to deliver the glycopeptide to a therapeutic site.

Embodiment 26: The delivery system of embodiment 14, wherein the glycoaggregate further comprising triglycerides.

Embodiment 27: The delivery system of embodiment 26, wherein the co-surfactants encapsulate the triglycerides.

Embodiment 28: The delivery system of embodiment 14, wherein the form of spectroscopy used is Diffusion Ordered Spectroscopy (DOSY).

Embodiment 29: The delivery system of embodiment 14, wherein the form of spectroscopy used is Dynamic Light Scattering (DLS).

Embodiment 30: A supramolecular assembly, said supramolecular assembly comprising: at least one glycopeptide; at least one amphipathic molecule; and wherein said supramolecular assembly is capable of delivering the at least one glycopeptide to a cell without the supramolecular assembly fusing into the cell.

Embodiment 31: The supramolecular assembly of embodiment 30, wherein the supramolecular assembly is a micelle or vesicle.

Embodiment 32: The supramolecular assembly of embodiment 31, wherein the vesicle is a unilamellar vesicle or a multilamellar vesicle.

Embodiment 33: The supramolecular assembly of embodiment 30, wherein the glycopeptide is a drug or a pro-drug.

Embodiment 34: The supramolecular assembly of embodiment 30, wherein the glycopeptide is a glycosylated opioid peptide or lactomorphin.

Embodiment 35: The supramolecular assembly of embodiment 30, wherein the at least one amphipathic molecule is a glycosylated endomorphin, dermorphin, or angiotensin, a glycosylated VEGF peptide fragment, or a glycosylated oxytocin, VIP or PACAP agonist, or another glycopeptide with desirable biological properties.

Embodiment 36: The supramolecular assembly of embodiment 30, wherein the at least one amphipathic molecule is a lipid.

Embodiment 37: The supramolecular assembly of embodiment 37, wherein the lipid is a glycolipid according to any one of the following structures:

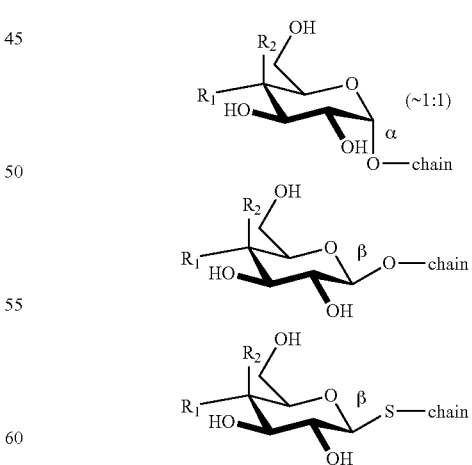

wherein $R_1$ is H, OH, O-β-D-Glucose, O-β-D-Galactose, or O-α-D-Glucose; wherein $R_2$ is H or OH;

wherein the chain is according to any one of the following formulas:

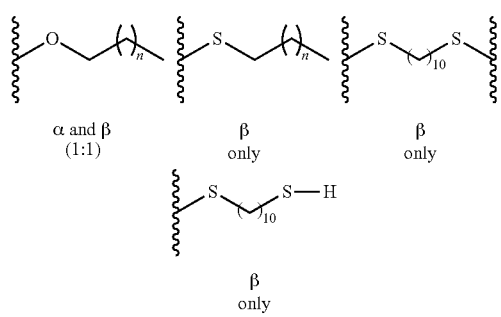

wherein n is 6, 8, or 10.

Embodiment 38: The supramolecular assembly of embodiment 37, wherein the lipid is according to any one of the following structures:

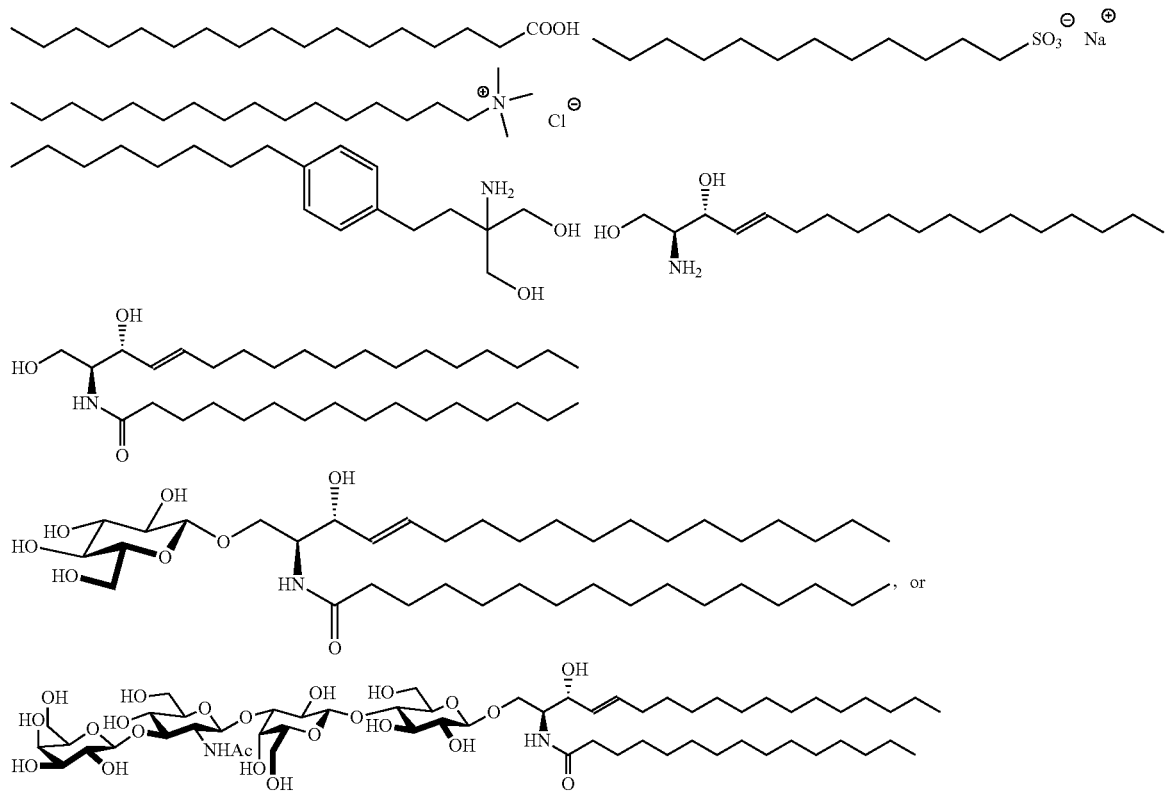

Embodiment 39: The supramolecular assembly of embodiment 30, wherein the supramolecular assembly is in a form of a nanoparticle or microemulsion.

Embodiment 40: The supramolecular assembly of embodiment 30, wherein the supramolecular assembly has a diameter of about 5-10 nm.

Embodiment 41: The supramolecular assembly of embodiment 30, wherein the supramolecular assembly is configured to deliver the glycopeptide to a therapeutic site.

Embodiment 42: The supramolecular assembly of embodiment 30, wherein the supramolecular assembly further comprises triglycerides.

Embodiment 43: The supramolecular assembly of embodiment 42, wherein the at least one amphipathic molecule encapsulates the triglycerides.

Embodiment 44: The supramolecular assembly of embodiment 30, wherein spectroscopy is used to determine the supramolecular assembly's diffusion coefficient.

Embodiment 45: The supramolecular assembly of embodiment 44, wherein the form of spectroscopy used is Diffusion Ordered Spectroscopy (DOSY).

Embodiment 46: The supramolecular assembly of embodiment 44, wherein the form of spectroscopy used is Dynamic Light Scattering (DLS).

Embodiment 47: The supramolecular assembly of embodiment 30, wherein the supramolecular assembly is dispersed in a liquid.

Embodiment 48: The supramolecular assembly of embodiment 30, wherein the supramolecular assembly is a precipitated solid lipid nanoparticle (SLN).

Embodiment 49: The supramolecular assembly of embodiment 30, wherein the supramolecular assembly is dispersed in a gas.

Embodiment 50: The supramolecular assembly of embodiment 30, wherein the supramolecular assembly delivers the at least one glycopeptide to the cell via repeated intermittent physical interactions between the supramolecular assembly and a plasma membrane of the cell.

Embodiment 51: The supramolecular assembly of embodiment 30, wherein the at least one glycopeptide is a therapeutic glycopeptide.

Embodiment 52: The supramolecular assembly of embodiment 30, wherein the supramolecular assembly further comprises at least one therapeutic molecule.

Embodiment 53: The supramolecular assembly of embodiment 52, wherein the supramolecular assembly delivers the at least one therapeutic molecule to the cell via repeated intermittent physical interactions between the supramolecular assembly and a plasma membrane of the cell.

Embodiment 54: A method of optimizing formation of a glycoaggregate, the method comprising: forming a first glycoaggregate from at least two co-surfactants according to two or more reaction parameters, wherein the at least two co-surfactants comprises a glycopeptide and at least one amphipathic molecule; characterizing the first glycoaggregate using spectroscopy to determine a first diffusion coefficient; modifying at least one of the reaction parameters; forming a second glycoaggregate from at least two co-surfactants according to the modified reaction parameters, wherein the at least two co-surfactants comprises a glycopeptide and at least one amphipathic molecule; characterizing the second glycoaggregate using spectroscopy to determine a second diffusion coefficient; and comparing the first and second diffusion coefficients to determine if the first glycoaggregate or the second glycoaggregate is more suitable for a specific application.

Embodiment 55: The method of embodiment 54, wherein the first glycoaggregate is a micelle or vesicle.

Embodiment 56: The method of embodiment 54, wherein the second glycoaggregate is a micelle or vesicle.

Embodiment 57: The method of embodiment 54, wherein the reaction parameters are selected from the group comprising a number of the co-surfactants, a selection of the co-surfactants, a ratio of the co-surfactants, a concentration of the co-surfactants, an order of addition of the co-surfactants, a reaction temperature, a mixing time, a presence of a catalyst, and a type of solvent system.

Embodiment 58: The method of embodiment 54, wherein the glycopeptide is a drug or a pro-drug.

Embodiment 59: The method of embodiment 54, wherein the glycopeptide is synthesized by providing a peptide, providing a saccharide, and covalently linking the peptide with the saccharide, thereby forming said glycopeptide.

Embodiment 60: The method of embodiment 59, wherein the peptide includes a serine residue, wherein the saccharide is linked to the serine residue.

Embodiment 61: The method of embodiment 59, wherein the saccharide is a glucose.

Embodiment 62: The method of embodiment 59, wherein the peptide is a drug or a pro-drug.

Embodiment 63: The method of embodiment 54, wherein the glycopeptide is a glycosylated opioid peptide.

Embodiment 64: The method of embodiment 54, wherein the glycopeptide is lactomorphin.

Embodiment 65: The method of embodiment 54, wherein the specific application is drug delivery.

Embodiment 66: The method of embodiment 54, wherein the at least one amphipathic molecule is a glycosylated endomorphin, dermorphin, or angiotensin, a glycosylated VEGF peptide fragment, or a glycosylated oxytocin, VIP or PACAP agonist, or another glycopeptide with desirable biological properties.

Embodiment 67: The method of embodiment 54, wherein the at least one amphipathic molecule is a lipid.

Embodiment 68: The method of embodiment 67, wherein the lipid is a glycolipid according to any one of the following structures:

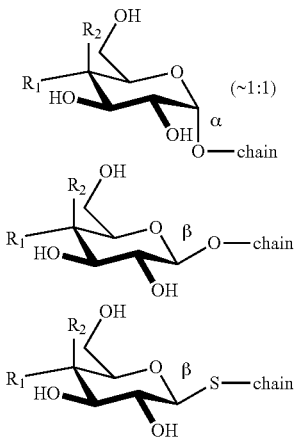

wherein $R_1$ is H, OH, O-β-D-Glucose, O-β-D-Galactose, or O-α-D-Glucose; wherein $R_2$ is H or OH;

wherein the chain is according to any one of the following formulas:

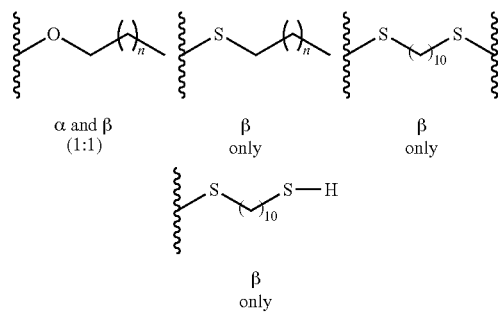

wherein n is 6, 8, or 10.

Embodiment 69: The method of embodiment 67, wherein the lipid is according to any one of the following structures:

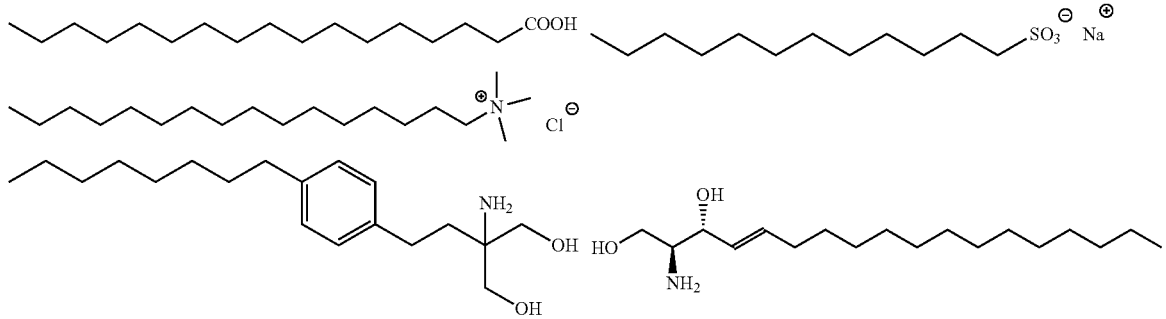

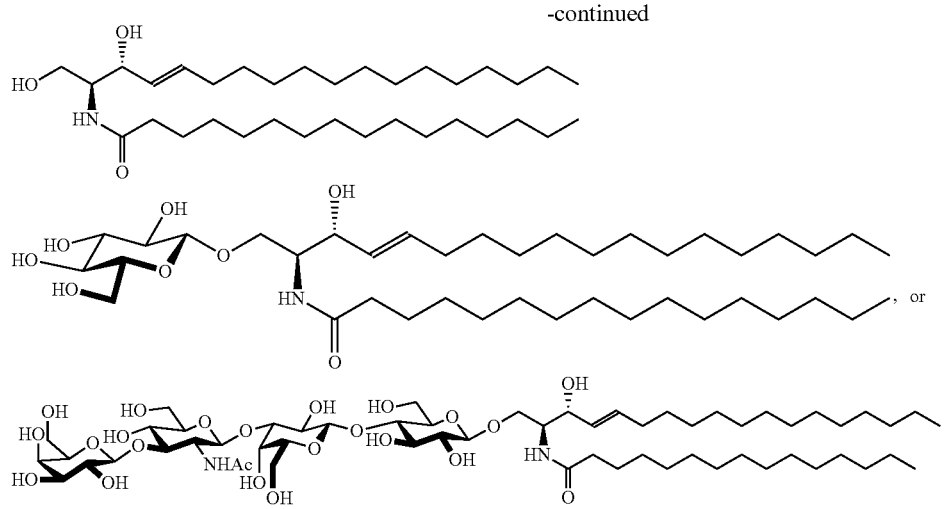

Embodiment 70: The method of embodiment 54, wherein the form of spectroscopy used is Diffusion Ordered Spectroscopy (DOSY).

Embodiment 71: The method of embodiment 54, wherein the form of spectroscopy used is Dynamic Light Scattering (DLS).

Embodiment 72: The method of embodiment 1, wherein the at least one glycopeptide is a glycosylated endomorphin, dermorphin, or angiotensin, a glycosylated VEGF peptide fragment, or a glycosylated oxytocin, VIP or PACAP agonist, or another glycopeptide with desirable biological properties.

Embodiment 73: The glycopeptide delivery system of embodiment 14, wherein the at least one glycopeptide is a glycosylated endomorphin, dermorphin, or angiotensin, a glycosylated VEGF peptide fragment, or a glycosylated oxytocin, VIP or PACAP agonist, or another glycopeptide with desirable biological properties.

Embodiment 74: The supramolecular assembly of embodiment 20, wherein the at least one glycopeptide is a glycosylated endomorphin, dermorphin, or angiotensin, a glycosylated VEGF peptide fragment, or a glycosylated oxytocin, VIP or PACAP agonist, or another glycopeptide with desirable biological properties.

Embodiment 75: The method of embodiment 54, wherein the at least one glycopeptide is a glycosylated endomorphin, dermorphin, or angiotensin, a glycosylated VEGF peptide fragment, or a glycosylated oxytocin, VIP or PACAP agonist, or another glycopeptide with desirable biological properties.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A supramolecular assembly comprising:
   a. at least one glycopeptide; and
   b. at least one amphipathic molecule;
   wherein said supramolecular assembly is capable of delivering the at least one glycopeptide to a cell; and wherein the at least one glycopeptide is a glycosylated angiotensin, glycosylated VEGF peptide fragment, glycosylated oxytocin, glycosylated VIP agonist, or glycosylated PACAP agonist.

2. The supramolecular assembly of claim 1, wherein the at least one amphipathic molecule is a glycosylated endomorphin, glycosylated dermorphin, glycosylated angiotensin, glycosylated VEGF peptide fragment, glycosylated oxytocin, glycosylated VIP agonist, or glycosylated PACAP agonist.

3. The supramolecular assembly of claim 1, wherein the at least one amphipathic molecule is a glycolipid according to any one of the following structures:

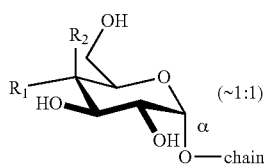

-continued

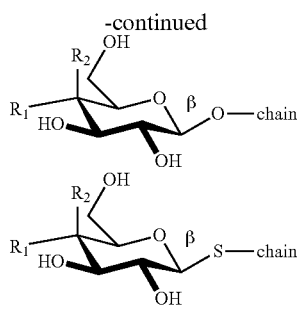

wherein $R_1$ is H, OH, O-β-D-Glucose, O-β-D-Galactose, or O-α-D-Glucose; wherein $R_2$ is H or OH; wherein the O-chain is according to the formula:

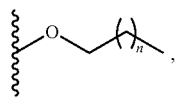

α and β
(1:1)

wherein the S-chain is according to any one of the following formulas:

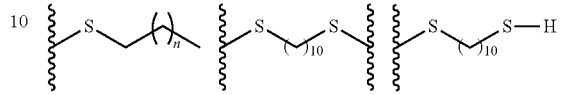

β only, β only, β only, and wherein n is 6, 8, or 10.

4. The supramolecular assembly of claim 1, wherein the at least one amphipathic molecule is a lipid according to any one of the following structures:

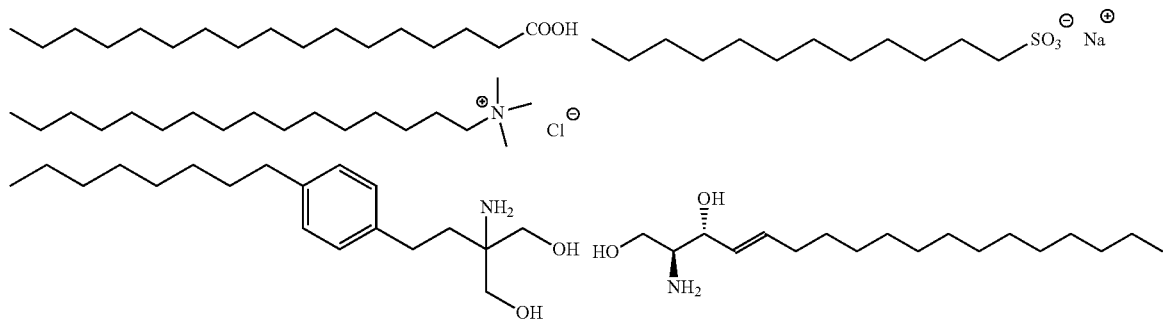

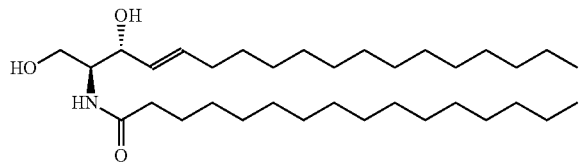

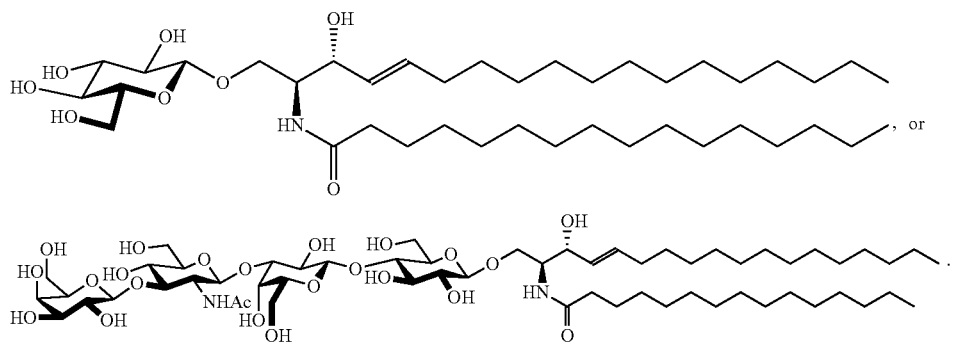

, or

5. The supramolecular assembly of claim 1, wherein the supramolecular assembly further comprises at least one therapeutic molecule.

6. The supramolecular assembly of claim 1, wherein spectroscopy is used to determine the supramolecular assembly's diffusion coefficient.

7. A method of optimizing formation of a glycoaggregate, the method comprising:
   a. forming the glycoaggregate from at least two co-surfactants, wherein the first co-surfactant comprises a glycopeptide and the second co-surfactant comprises at least one amphipathic molecule; and wherein the at least one glycopeptide is a glycosylated angiotensin, glycosylated VEGF peptide fragment, glycosylated oxytocin, glycosylated VIP agonist, or glycosylated PACAP agonist;
   b. characterizing the glycoaggregate using spectroscopy to determine a diffusion coefficient; and
   c. comparing the diffusion coefficient to an optimal range of diffusion coefficients for

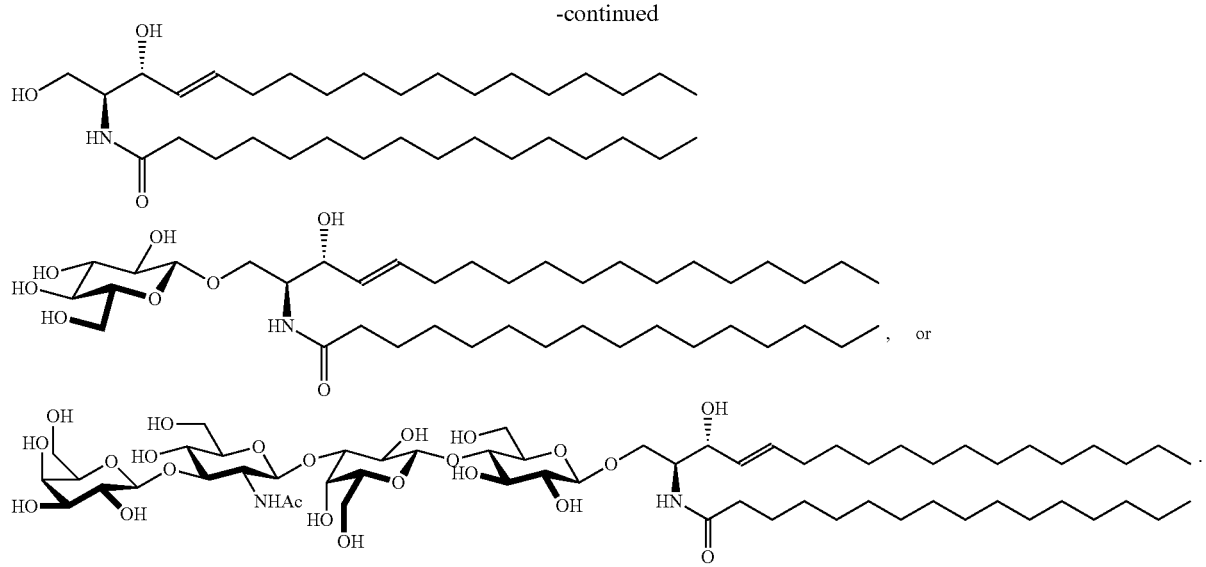
12. The method of claim 7, wherein the at least one amphipathic molecule is a lipid is according to any one of the following structures:
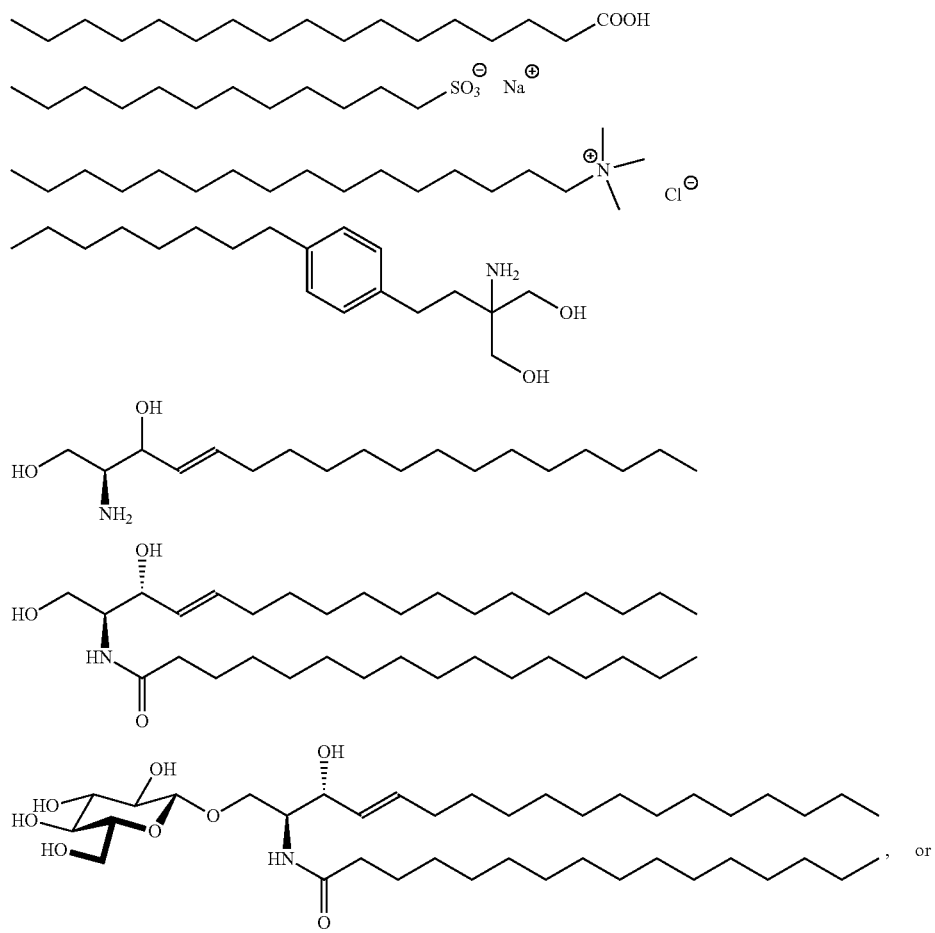

-continued

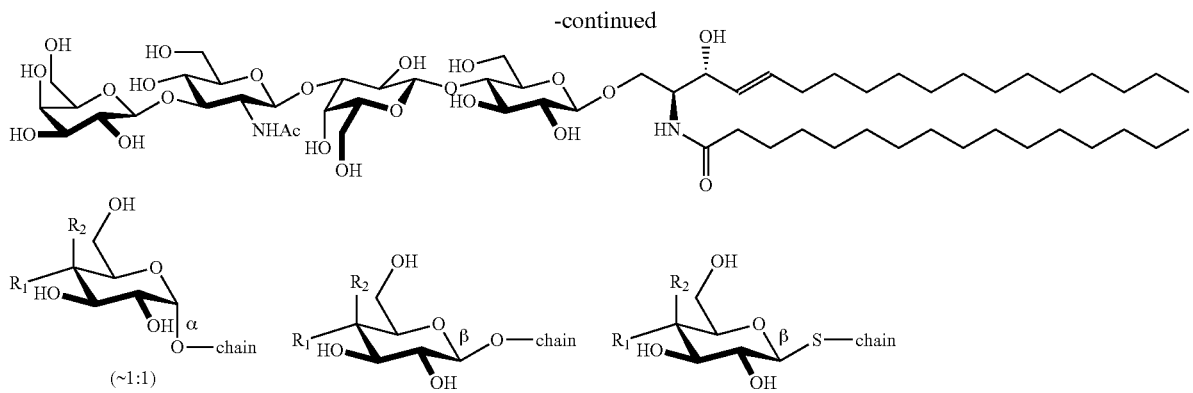

wherein $R_1$ is H, OH, O-β-D-Glucose, O-β-D-Galactose, or O-α-D-Glucose; wherein $R_2$ is H or OH;
wherein the O-chain is according to the formula:

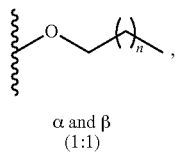

α and β
(1:1)

wherein the S-chain is according to any one of the following formulas:

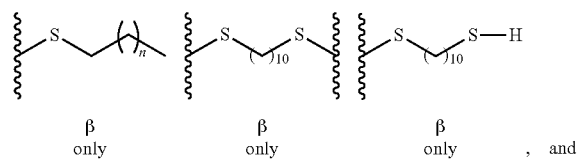

wherein n is 6, 8, or 10.

13. The method of claim 7, wherein the form of spectroscopy used is at least one of Diffusion Ordered Spectroscopy (DOSY) or Dynamic Light Scattering (DLS).

14. The method of claim 7, the method further comprising:
 a. forming the glycoaggregate according to two or more reaction parameters;
 b. modifying at least one of the reaction parameters;
 c. forming a second gylcoaggregate from at least two co-surfactants according to the modified reaction parameters, wherein the at least two co-surfactants comprise a glycopeptide and at least one amphipathic molecule;
 d. characterizing the second glycoaggregate using spectroscopy to determine a second diffusion coefficient; and
 e. comparing the diffusion coefficient to the second diffusion coefficient to determine if the glycoaggregate or the second glycoaggregate is more suitable for a specific application.

15. A glycopeptide delivery system, comprising a glycoaggregate comprising:
 a. a first co-surfactant comprising a glycopeptide; and
 b. a second co-surfactant comprising at least one amphipathic molecule;

wherein the first co-surfactant and the second co-surfactant aggregate to form said glycoaggregate, wherein the glycoaggregate has a diffusion coefficient determined using spectroscopy; and wherein the at least one glycopeptide is a glycosylated angiotensin, glycosylated VEGF peptide fragment, glycosylated oxytocin, glycosylated VIP agonist, or glycosylated PACAP agonist.

16. The delivery system of claim 15, wherein the at least one amphipathic molecule is a glycosylated endomorphin, glycosylated dermorphin, glycosylated angiotensin, glycosylated VEGF peptide fragment, glycosylated oxytocin, glycosylated VIP agonist, or glycosylated PACAP agonist.

17. The delivery system of claim 15, wherein the at least one amphipathic molecule is a glycolipid according to any one of the following structures:

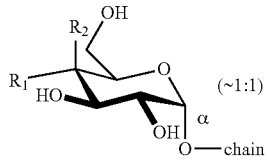

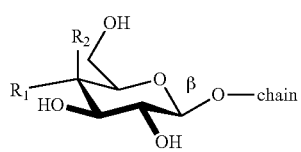

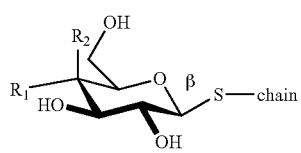

wherein $R_1$ is H, OH, O-β-D-Glucose, O-β-D-Galactose, or O-α-D-Glucose; wherein $R_2$ is H or OH;

wherein the O-chain is according to the formula:

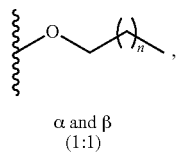

α and β
(1:1)

wherein the S-chain is according to any one of the following formulas:

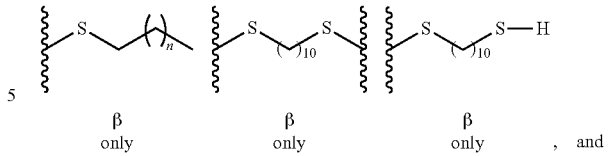

wherein n is 6, 8, or 10.

18. The delivery system of claim 15, wherein the at least one amphipathic molecule is a lipid according to any one of the following structures:

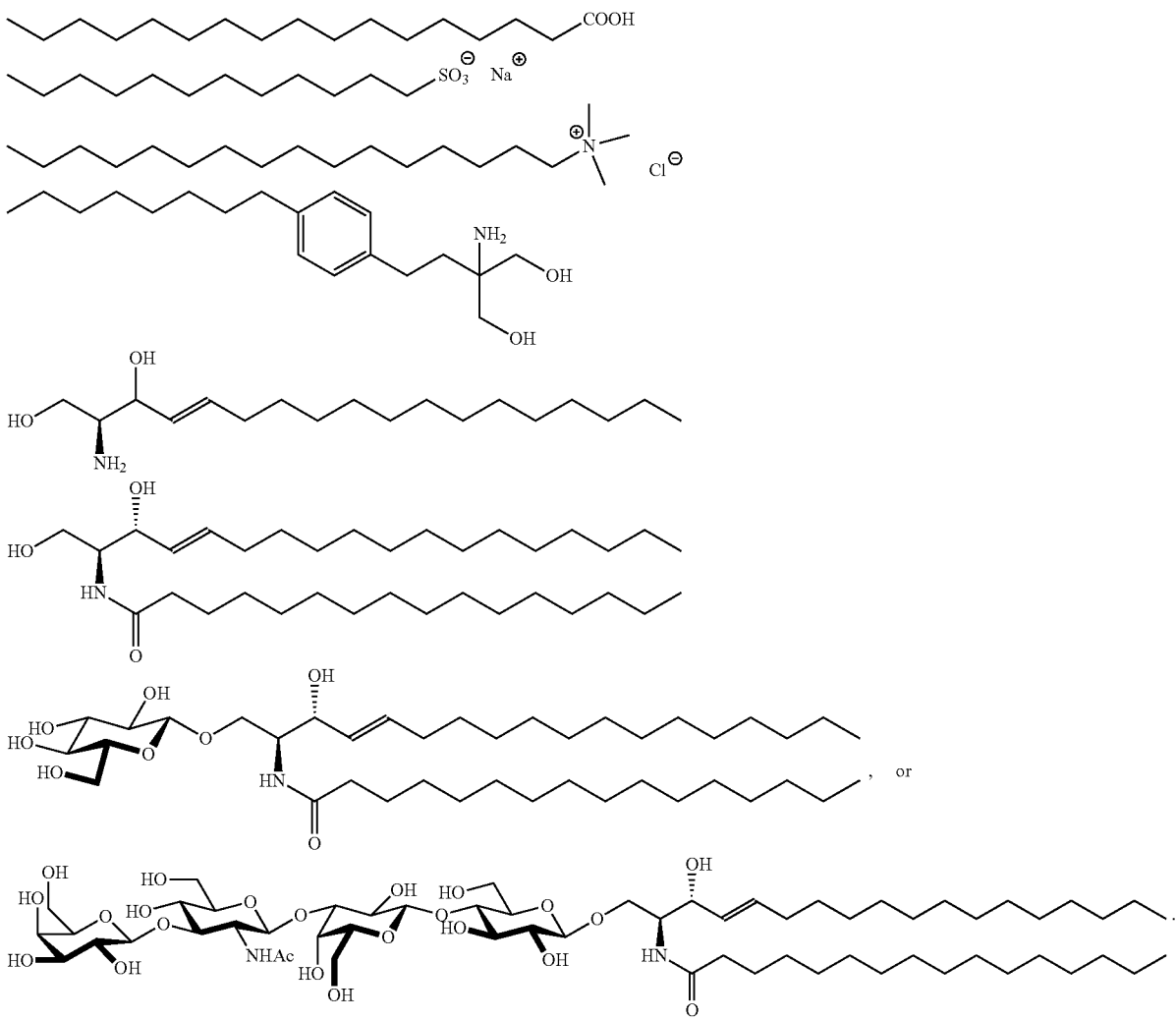

19. The delivery system of claim 15, wherein the form of spectroscopy used is at least one of Diffusion Ordered Spectroscopy (DOSY) or Dynamic Light Scattering (DLS).

* * * * *